(12) United States Patent
Oikawa et al.

(10) Patent No.: US 8,585,014 B2
(45) Date of Patent: *Nov. 19, 2013

(54) LINEAR SOLENOID AND VALVE DEVICE USING THE SAME

(75) Inventors: Naoki Oikawa, Miyagi (JP); Shigeto Ryuen, Sendai (JP); Takashi Yokoyama, Natori (JP)

(73) Assignee: Keihin Corporation, Tokyo (JP)

( * ) Notice: Subject to any disclaimer, the term of this patent is extended or adjusted under 35 U.S.C. 154(b) by 489 days.

This patent is subject to a terminal disclaimer.

(21) Appl. No.: 12/776,724

(22) Filed: May 10, 2010

(65) Prior Publication Data

US 2010/0308244 A1 Dec. 9, 2010

(30) Foreign Application Priority Data

May 13, 2009 (JP) ................................. 2009-117052
Jun. 24, 2009 (JP) ................................. 2009-150252
Sep. 30, 2009 (JP) ................................. 2009-228179

(51) Int. Cl.
*F16K 31/02* (2006.01)

(52) U.S. Cl.
USPC .................................................. 251/129.15

(58) Field of Classification Search
USPC .................................................. 251/129.15
See application file for complete search history.

(56) References Cited

U.S. PATENT DOCUMENTS

| | | | | |
|---|---|---|---|---|
| 4,604,600 A | * | 8/1986 | Clark | 335/261 |
| 4,662,605 A | * | 5/1987 | Garcia | 251/129.08 |
| 5,123,718 A | * | 6/1992 | Tyler | 303/118.1 |
| 5,727,769 A | * | 3/1998 | Suzuki | 251/129.15 |
| 5,848,613 A | * | 12/1998 | Sakaguchi et al. | 137/625.65 |
| 6,062,536 A | * | 5/2000 | Bircann | 251/129.15 |
| 6,092,784 A | * | 7/2000 | Kalfsbeck | 251/129.15 |
| 6,206,343 B1 | * | 3/2001 | Kato et al. | 251/129.15 |
| 6,302,371 B1 | * | 10/2001 | Reiter | 251/129.21 |
| 6,315,268 B1 | * | 11/2001 | Cornea et al. | 251/129.15 |
| 6,446,606 B1 | * | 9/2002 | Krimmer et al. | 123/458 |
| 6,498,416 B1 | * | 12/2002 | Oishi et al. | 310/214 |

(Continued)

FOREIGN PATENT DOCUMENTS

| | | |
|---|---|---|
| JP | 09-269079 | 10/1997 |
| JP | 09-324211 A | 12/1997 |

(Continued)

OTHER PUBLICATIONS

Japanese Office Action dated Mar. 5, 2013, issued in counterpart Japanese Application No. 2009-117052.

(Continued)

*Primary Examiner* — John K Fristoe, Jr.
*Assistant Examiner* — Matthew W Jellett
(74) *Attorney, Agent, or Firm* — Arent Fox

(57) ABSTRACT

A linear solenoid comprising: linear solenoid portion, comprising: a coil; a cylindrical movable core which is attracted toward a fixed core when the coil is energized; and a cylindrical yoke which surrounds an outer circumference surface of the movable core, wherein the movable core has a shaftless structure, a first plain bearing and a second plain bearing for slidably supporting both ends of the movable core are provided respectively at both ends of a cylindrical yoke along its axis, and the first plain bearing and the second plain bearing are provided to be projected from the inner circumference surface of the cylindrical yoke by a predetermined length T toward the movable core.

13 Claims, 19 Drawing Sheets

(56) References Cited

U.S. PATENT DOCUMENTS

| | | | |
|---|---|---|---|
| 6,547,215 B2* | 4/2003 | Matsusaka et al. | 251/129.15 |
| 6,601,822 B2* | 8/2003 | Tachibana et al. | 251/129.15 |
| 6,615,780 B1* | 9/2003 | Lin et al. | 123/90.17 |
| 6,695,284 B2* | 2/2004 | Isobe et al. | 251/129.15 |
| 6,922,124 B2* | 7/2005 | Segi et al. | 335/220 |
| 7,075,394 B2* | 7/2006 | Matsusaka et al. | 335/80 |
| 2001/0013584 A1* | 8/2001 | Matsusaka et al. | 251/129.15 |
| 2002/0101314 A1* | 8/2002 | Oishi et al. | 335/256 |
| 2003/0184422 A1* | 10/2003 | Matsusaka et al. | 335/220 |
| 2004/0011982 A1* | 1/2004 | Hirata et al. | 251/129.15 |
| 2004/0056227 A1* | 3/2004 | Mayr et al. | 251/129.15 |
| 2005/0211938 A1* | 9/2005 | Ryuen et al. | 251/129.15 |
| 2008/0203342 A1* | 8/2008 | Ryuen et al. | 251/129.15 |
| 2008/0308757 A1* | 12/2008 | Nakai et al. | 251/129.15 |
| 2009/0032753 A1* | 2/2009 | Ishibashi et al. | 251/129.15 |
| 2009/0301588 A1* | 12/2009 | Shimizu et al. | 137/625.64 |

FOREIGN PATENT DOCUMENTS

| | | |
|---|---|---|
| JP | 2001-123906 | 5/2001 |
| JP | 2004-153161 A | 5/2004 |
| JP | 2005-276966 A | 10/2005 |
| JP | 2006-097723 A | 4/2006 |
| JP | 2008-034528 | 2/2008 |

OTHER PUBLICATIONS

Japanese Office Action, Application No. 2009-228179 dated Jul. 16, 2013.

* cited by examiner

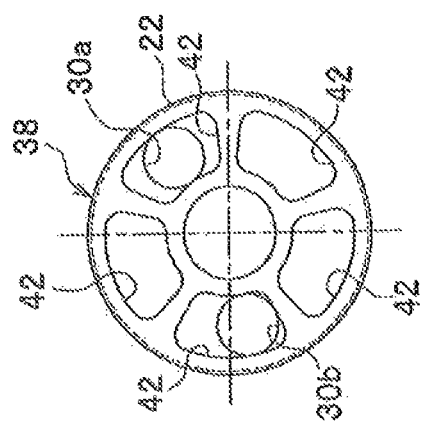
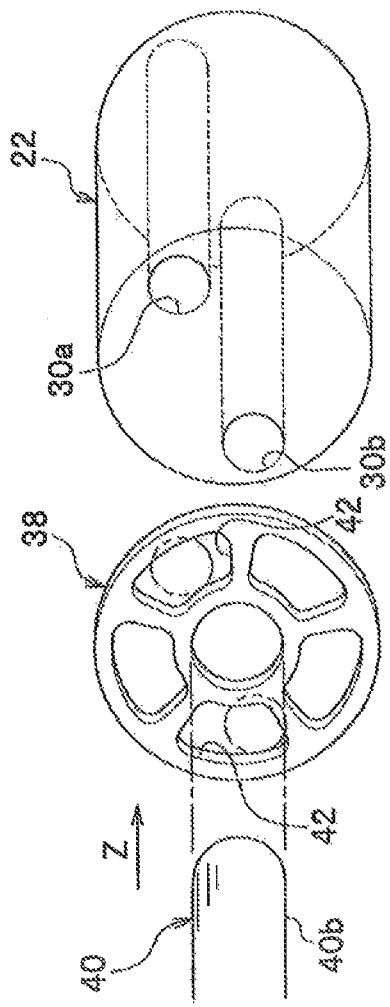

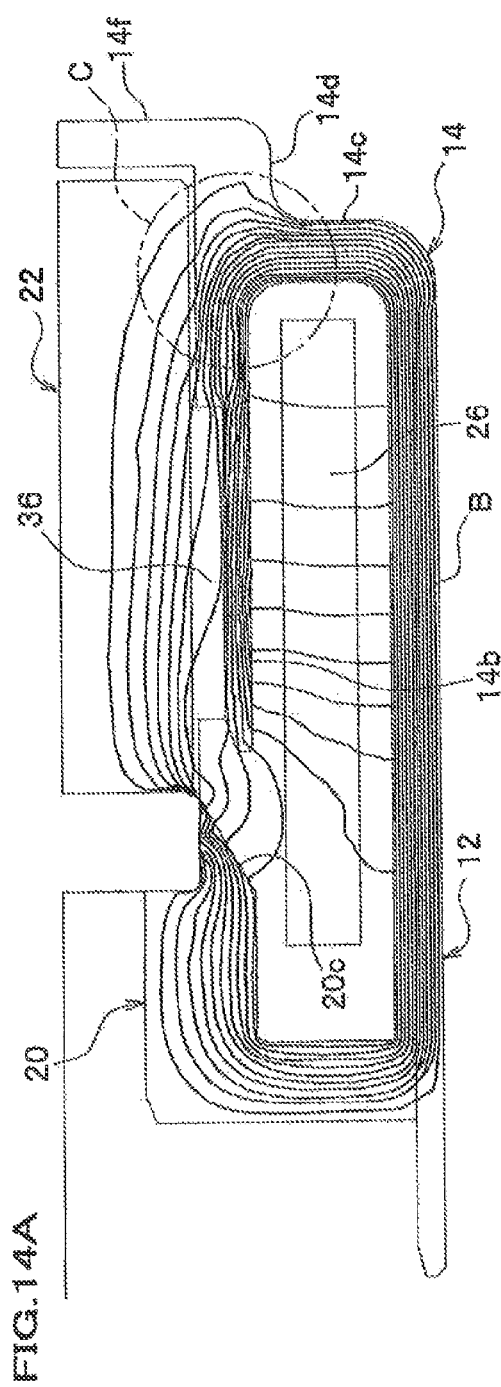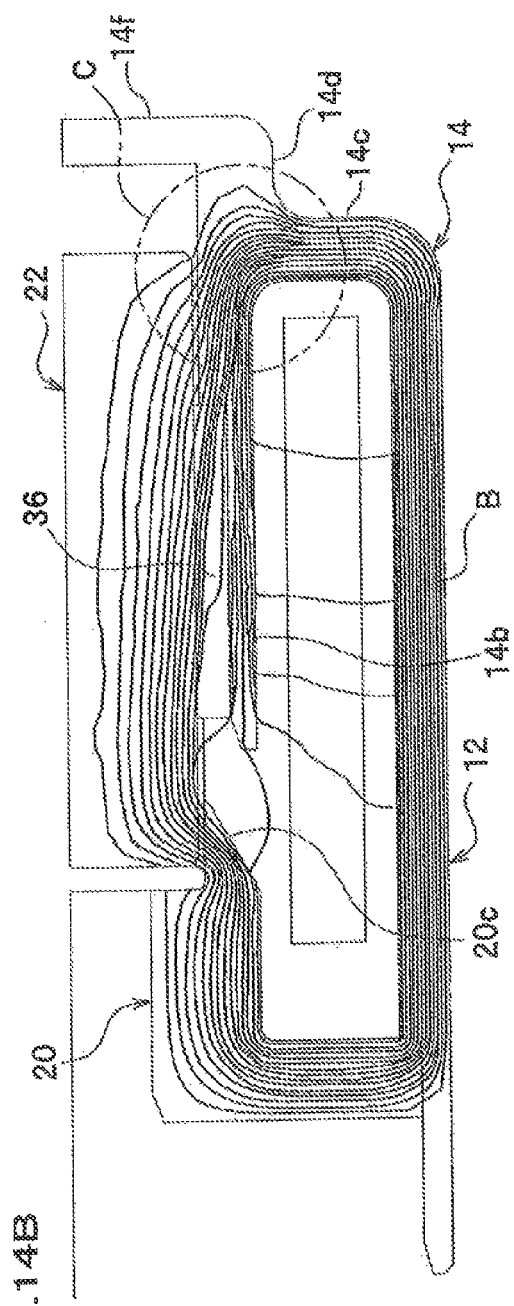

LINEAR SOLENOID AND VALVE DEVICE USING THE SAME

CROSS REFERENCE TO RELATED APPLICATIONS

The present application claims benefit of the filing date of Japanese Patent Applications No. 2009-117052 filed on May 13, 2009, No. 2009-150252 filed on Jun. 24, 2009, and No. 2009-228179 filed on Sep. 30, 2009, the disclosure of which are incorporated herein by reference.

BACKGROUND OF THE INVENTION

1. Field of the Invention

The present invention relates to a linear solenoid which causes an excitation effect by being energized and a valve device using the same.

2. Description of the Related Art

Conventionally, a linear solenoid valve having a valve element to switch between a communication state and a discommunication state of an inlet port and an outlet port by transmitting a displacement of a movable core caused by an excitation effect of a solenoid has been used.

As for such an linear solenoid valve, the present applicant has proposed a linear solenoid valve which enables an enhancement of an attractive force to a movable core (e.g., see JP 2006-097723 A).

In such a linear solenoid valve disclosed in JP 2006-097723 A, both ends of a shaft passing through a center of the movable core are supported by a first plain bearing and a second plain bearing respectively, and the first and second plain bearings are made of a sintered compact including a sintered metal.

By the way, in the linear solenoid valve disclosed in JP 2006-097723 A, because the shaft is fixed along a center hole passing through the movable core, for example, if an outer diameter of the movable core is reduced so as to achieve a small outer diameter, a saturated state of a magnetic flux density may occur in the movable core. As a result, it becomes difficult to reduce the outer diameter of the movable core, and finally it becomes difficult to miniaturize the solenoid.

Also, in the linear solenoid valve disclosed in JP 2006-097723 A, when the shaft is pushed along the center hole passing through the movable core, an axis of the movable core may moves off an axis of the shaft, and between an outer circumference surface of the movable core and an inner circumference surface of a cylindrical yoke which surrounds the movable core, a force to attract the movable core toward the cylindrical yoke in a radial direction (side force) may be increased. As a result, it becomes difficult to enhance a hysteresis property of the solenoid.

Further, because both ends of the shaft passing through the movable core are supported by the first plain bearing and the second plain bearing respectively, the solenoid is elongated along the axis of the shaft. As a result, it becomes difficult to miniaturize the solenoid.

In addition, associated with the linear solenoid valve disclosed in JP 2006-097723 A, the present applicant has proposed a linear solenoid which can miniaturize the entire device and enhance the hysteresis property, and a valve device using the same (see Japanese Patent Application No. 2009-117052).

SUMMARY OF THE INVENTION

A general object of the present invention is to provide a linear solenoid which can be miniaturized, and a valve device using the same.

A primary object of the present invention is to provide a linear solenoid which can enhance a hysteresis property, and a valve device using the same.

An another object of the present invention is to provide a linear solenoid which can enhance wear resistance of a movable core which contacts bearings provided on a cylindrical yoke, and a valve device using the same.

According to the present invention, by providing a shaftless structure having no conventional shaft to a movable core, magnetic flux density saturation of the movable core can be reduced compared to a conventional structure having a shaft. As a result, the present invention can reduce the outer diameter and/or an axial length of movable core so as to miniaturize the movable core, resulting in miniaturization of the entire linear solenoid.

Also, according to the present invention, a plurality of bearings are arranged at both ends of a cylindrical yoke along an axial direction respectively, and the movable core can be made coaxial with the cylindrical yoke easily. By making the movable core coaxial with the cylindrical yoke, a side force (a force to attract the movable core outwardly in a radial direction) can be decreased, and a preferable hysteresis property can be obtained.

Further, according to the present invention, for example, by setting a projection length (a predetermined length) of bearings projecting from the inner circumference surface of the cylindrical yoke toward the movable core properly, a magnetic gap, which is a gap in a radial direction between an inner circumference surface of the cylindrical yoke and an outer circumference surface of the movable core, can be provided with ease and high accuracy. As a result, in the present invention, the magnetic gap can be minimized and the attractive force to the movable core can be enhanced.

Still further, according to the present invention, by inserting (including pushing) the plurality of bearings for supporting both ends of the movable core from both ends of the cylindrical yoke respectively along the axial direction, the bearings can be attached to annular recesses formed at both ends of the cylindrical yoke in the axial direction easily, the assembling operation can be facilitated, and the assembly performance can be enhanced.

Still further, according to the present invention, by forming a cylindrical projection on a housing and making a disc member to block the cylindrical projection with a nonmagnetic material, a space in the housing in which the movable core is provided can be sealed easily, and the movable core can be prevented from being affixed to the disc member.

Still further, according to the present invention, by arranging one end of the movable core which faces to a housing bottom surface so as to intersect a line which is approximately orthogonal to the axis of the movable core and passes through the center of the housing bottom surface, a magnetic flux flow which flows toward the movable core from the housing bottom surface whose axial thickness is thicker than a radial thickness of a cylindrical portion provided on an outmost surface of the housing can be made to be preferable. As a result, in the present invention, the magnetic flux density caused by the excitation effect of the linear solenoid can be increased and the attractive force to the movable core can be enhanced. In addition, arranging one end of the movable core so as to intersect the line means that arranging the movable core so that any portion of one end of the movable core intersects the line passing through the center of the housing bottom surface.

Still further, according to the present invention, even if the bearings for supporting one end of the movable core are arranged to be approximately orthogonal to the axis of the movable core and to intersect the line passing through the center of the housing bottom surface, the bearings can be prevented from causing an obstruction to the magnetic flux flow. As a result, in the present invention, miniaturization of the linear solenoid achieved by shortening the axial length of the movable core and enhancement of the attractive force of the movable core achieved by increase in the generated magnetic flux density can go together. In addition, arranging one end of the movable core so as to intersect the line means arranging the movable core so that any portion of the bearing intersects the line passing through the center of the housing bottom surface.

According to the present invention, a single bearing is arranged at an intermediate portion between both ends of the cylindrical yoke along the axial direction and the movable core can be made coaxial with the cylindrical yoke easily. By making the movable core coaxial with the cylindrical yoke, the side force (the force to attract the movable core in the radial direction) can be decreased, and the preferable hysteresis property can be obtained.

Also, according to the present invention, by arranging the single bearing at the intermediate portion of the cylindrical yoke along the axial direction, the magnetic flux which flows from the housing bottom surface toward the movable core can be preferably prevented from being obstructed by the single bearing, and the magnetic flux flow which flows from the housing bottom surface toward the movable core can be made to be preferable.

Therefore, in the present invention, the magnetic flux density caused by the excitation effect of the linear solenoid can be increased and the attractive force to the movable core can be enhanced. As a result, in the present invention, miniaturization of the linear solenoid achieved by shortening the axial length of the movable core and enhancement of the attractive force of the movable core achieved by increase in the generated magnetic flux density can go together. In addition, by making the bearing for slidably supporting the movable core into a single component, the component count is reduced, resulting in cost-cutting.

Further, according to the present invention, by inserting (including pushing) the single bearing for slidably supporting the movable core from a fixed core along the axis of the cylindrical yoke, the bearing can be attached to a single annular recess formed on the inner circumference surface of the cylindrical yoke, the assembling operation can be facilitated, and the assembly performance can be enhanced.

Still further, according to the present invention, by providing a single annular recess into which the bearing can be inserted toward the inner circumference surface of the cylindrical yoke only from the fixed core and not providing the annular recess on the inner circumference surface of the cylindrical yoke on the housing bottom surface side opposite to the fixed core, the cylindrical yoke can be integrated with the housing bottom surface. In this case, for example, by providing a cap, etc., on the housing bottom surface side, the assembling man-hours and the component count can be reduced compared to the case where the housing bottom surface is blocked, resulting in reduction of manufacturing costs.

Still further, according to the present invention, because the single annular recess is merely formed on the inner circumference surface of the cylindrical yoke, for example, the axis of the cylindrical yoke can be prevented from moving off the axis of the movable core compared to the case where the plurality of annular recesses are provided on the inner circumference surface of the cylindrical yoke. As a result, the cylindrical yoke can be made coaxial with the movable core, and the hysteresis property can be enhanced.

Still further, according to the present invention, a projecting bottom portion can be formed on the housing, and the displacement of the movable core in one direction can be limited via a first stopper which is made of nonmagnetic material and is fixed to the projecting bottom portion. Also, by making the first stopper made of the nonmagnetic material into a simple structure composed of a single component and by swaging a cylindrical portion passing through a through hole of the projecting bottom portion so as to plastically deform the projecting bottom portion at an inner wall side and to manufacture with ease, the manufacturing costs can be reduces.

Still further, according to the present invention, the displacement of the movable core in another direction can be limited via a second stopper which is pushed into a hole which continues to the recess of the fixed core. Also, the displacement of the movable core is transmitted via a inserting hole formed at the second stopper so as to move a displacement transmission member. Further, by pushing the second stopper into the hole of the fixed core, the second stopper can be surely fixed to the fixed core with ease.

According to the present invention, by providing a hard layer which is harder than the inside of the movable core at a contact region to the bearing on an outer surface of the movable core, a hardness of the outer surface of the movable core is increased, resulting in enhancement of the wear resistance between the bearing and the contact region. In this case, according to the present invention, because the wear resistance is enhanced, preferable slidability between the movable core and the bearing can be obtained. As a result, in the present invention, the hysteresis property of the linear solenoid can be enhanced.

Also, according to the present invention, by forming the hard layer with, e.g., NiP plating, the hard layer having high hardness can be easily and inexpensively obtained. Also, by forming the hard layer with a nitrided film, not only problems such as exfoliation can be avoided compared to the plating, but also the hard layer can be formed on the outer surface without increasing an outer diameter of the a movable core which is composed of a cylindrical body. In addition, by forming the nitrided film by high-frequency heating, the nitrided film can be processed at high speed.

According to the present invention, a valve operating mechanism comprising: a valve body having a plurality of ports through which a pressure fluid flows; a linear solenoid; and a valve element which is provided within the valve body and switches between a communication state and a discommunication state among the plurality of ports by displacement of the movable core is provided. The valve operating mechanism allows the linear solenoid to be miniaturized and the hysteresis property to be enhanced, resulting in miniaturization and weight reduction of the entire valve device.

BRIEF DESCRIPTION OF THE DRAWINGS

FIG. 3A is an exploded perspective view showing a relationship among a spool, a nonmagnetic plate, and a movable core;

FIG. 3B is a cross-sectional view viewed in a direction of an arrow Z in FIG. 3A;

FIG. 14A is a schematic diagram showing a magnetic flux flow generated in the linear solenoid portion when the movable core abuts on the first stopper and is at an initial state;

FIG. 14B is a schematic diagram showing a magnetic flux flow generated in the linear solenoid portion when the movable core is at a displacement terminal position on the fixed core side;

DETAILED DESCRIPTION OF THE PREFERRED EMBODIMENTS

Next, with reference to FIGS. 1-19, embodiments of the present invention will be explained in detail.

Figure 1:
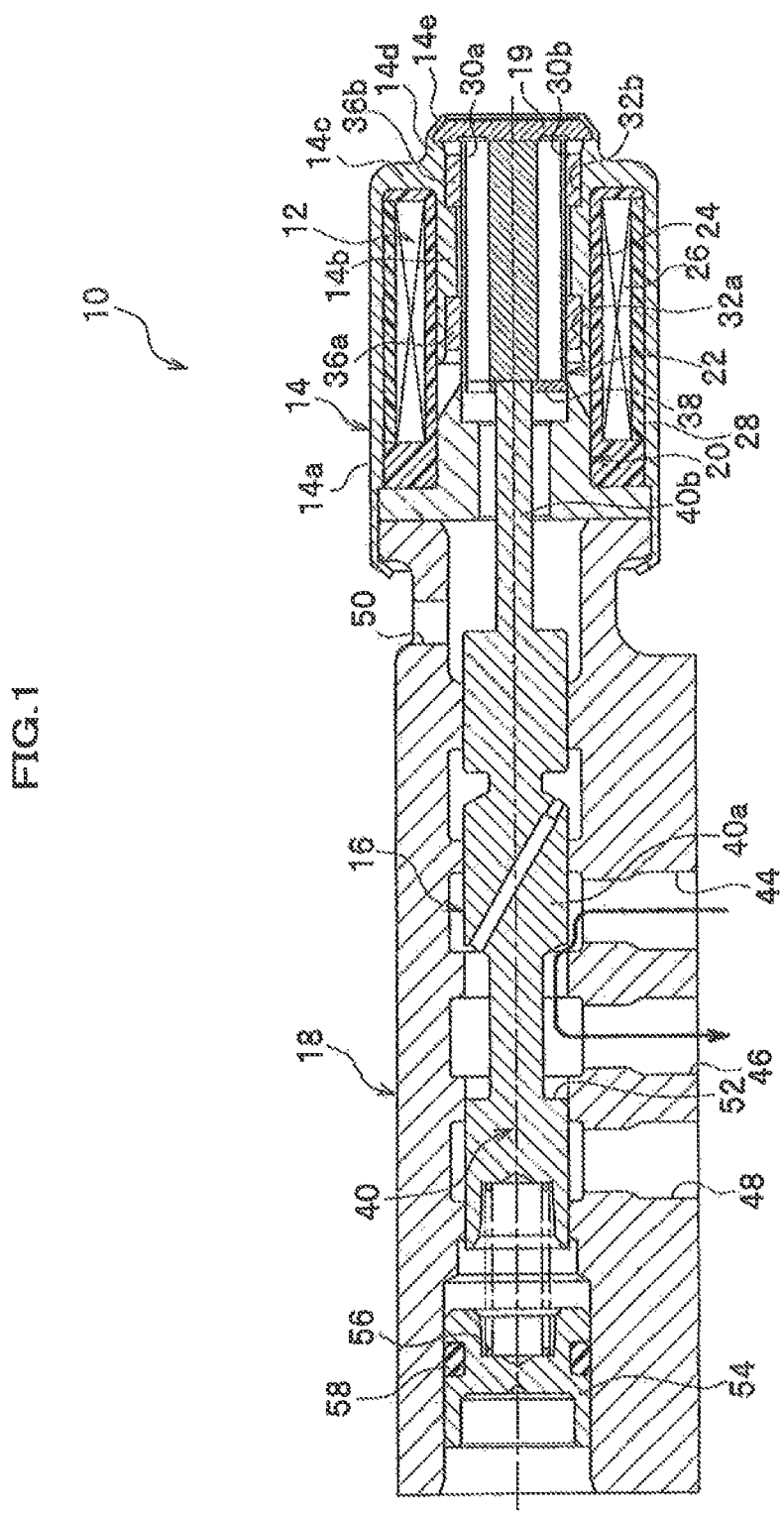
FIG. 1 is a longitudinal cross-sectional view of an oil pressure control unit, in which a linear solenoid according to an embodiment of the present invention is incorporated, along an axial direction.

As shown in FIG. 1, for example, an oil pressure control unit (a valve device) 10 comprises a cylindrical housing 14 which has a bottom and is made of a magnetic metal material, a linear solenoid portion (linear solenoid) 12 which is provided within the housing 14, a sleeve valve body 18 which is connected to the housing 14 integrally, and a valve operating mechanism 16 which is provided within the valve body 18.

Figure 2:
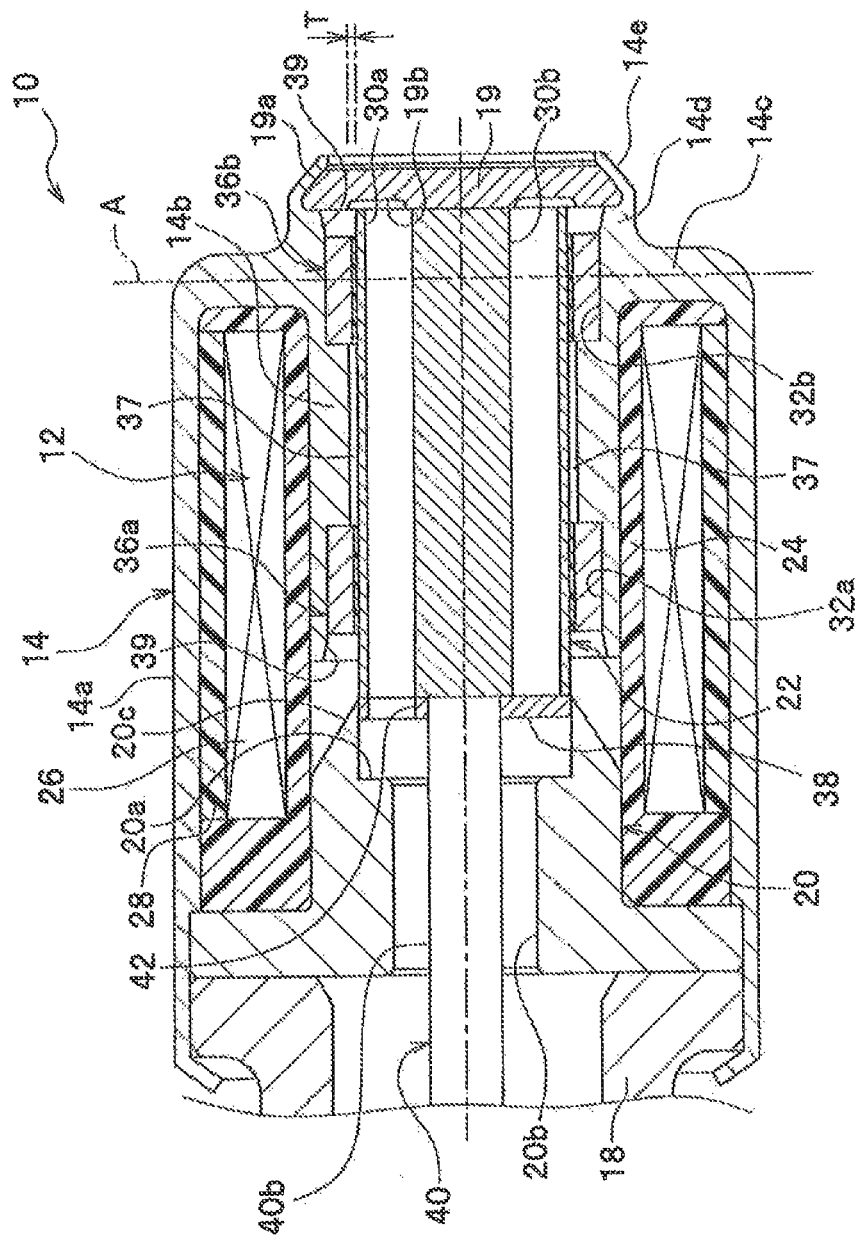
FIG. 2 is an enlarged longitudinal cross-sectional view of the linear solenoid portion of the oil pressure control unit shown in FIG. 1.

As shown in FIGS. 1 and 2, the long housing 14 is formed along an axial direction, and includes a cylindrical portion 14a which is provided on an outmost surface of the housing 14; a short cylindrical yoke 14b which is spaced apart by a predetermined distance from the cylindrical portion 14a in an inner radial direction and extends approximately parallel to the cylindrical portion 14a; and a housing bottom surface 14c which is formed at one end of the cylindrical portion 14a and the cylindrical yoke 14b (at a connecting portion) in the axial direction and whose axial thickness is thicker than a radial thickness of the cylindrical portion 14a.

Further, the housing 14 has a cylindrical projection 14d which continues to the housing bottom surface 14c and extends approximately parallel to the cylindrical portion 14a, and a thin swaging portion 14e which extends from the cylindrical projection 14d and swages a cap 19 (described below) so as to hold it. In this case, the cylindrical portion 14a, the cylindrical yoke 14b, the housing bottom surface 14c, the cylindrical projection 14d, and the swaging portion 14e are integrally formed.

As shown in FIG. 2, the cap 19 is a disc member made of a nonmagnetic material, and a tapering surface 19a is formed on an outer circumference surface which is held by the swaging portion 14e of the housing 14. Also, on an inner wall face of the cap 19 which is opposed to a movable core 22 (described below), an annular groove 19b which makes one fluid passage hole 30a of the movable core 22 communicate with other fluid passage hole 30b is formed.

In this case, as shown in FIG. 4, the cylindrical projection 14d (the housing 14) is blocked by inserting the cap 19 along the swaging portion 14e of the housing 14 so that the cap 19 abuts on the cylindrical projection 14d and pressing the thin swaging portion 14e inwardly by a pressing means (not shown).

In this embodiment, by forming the cylindrical projection 14d on the housing 14 and making the disc cap 19 to block the cylindrical projection 14d with a nonmagnetic material, a space in the housing 14 in which the movable core 22 is provided can be sealed easily, and the movable core 22 can be prevented from being affixed to the cap 19.

In addition, for example, the cylindrical yoke 14b may be formed by press-fitting other yoke (not shown) composed of an approximately-cylindrical body which is other component than the housing 14 into a fitting portion (not shown) formed on an inner circumference surface of the housing bottom surface 14c.

As shown in FIGS. 1 and 2, the linear solenoid portion 12 has a coil assembly which is accommodated in the housing 14, a cylindrical yoke 14b which is integrally formed with the housing 14 at an blocked end of the housing 14 and is provided within the coil assembly, a fixed core 20 which is connected to an open end of the cylindrical portion 14a and is arranged inside the coil assembly along the axial direction via the cylindrical yoke 14b and a predetermined clearance, and the movable core 22 which is displaceably arranged inside the cylindrical yoke 14b.

As shown in FIG. 2, at one end of the fixed core 20 which is spaced apart by a predetermined distance from and opposed to the movable core 22, an annular flange 20c having a tapered face on an outer circumference surface whose diameter gradually decreases and whose longitudinal section face has a sharp angle is provided. Also, on an internal diameter side of the annular flange 20c, an annular recess 20a which functions as a stopper for limiting the displacement of the movable core 22 via a nonmagnetic plate 38 (described below) is provided. Further, at an internal diameter side which extends from the recess 20a, a hole 20b which passes through along the axial direction is provided.

The coil assembly is made of a resin material, and composed of a coil bobbin 24 having flanges at both ends along the axial direction, and a coil 26 wound around the coil bobbin 24.

Between the housing 14 and the coil 26, a resin sealing member 28 to mold the outer circumference surface of the coil 26, etc., is provided, and the resin sealing member 28 includes a coupler (not shown) connected to the coil 26 and is integrally molded by the resin material. In the coupler, terminals (not shown) which are electrically connected to the coil 26 is provided.

The movable core 22 is composed of a shaft-less cylindrical body without a conventional shaft passing through its center portion, and the cylindrical body is provided with a plurality of fluid passage holes 30a and 30b which are spaced apart by about 180 degrees in the circumferential direction and pass through the movable core 22 along the axial direction. Through the fluid passage holes 30a and 30b, a pressure oil at one end of the movable core 22 along the axial direction can communicate with a pressure oil at another end.

At one end of the movable core 22 along the axial direction, a first plain bearing 36a which is attached to (pushed into) an annular recess 32a formed at an inner circumference surface of the cylindrical yoke 14b is provided, and the movable core 22 is slidably supported by the first plain bearing 36a along the axial direction. Also, at other end of the movable core 22 along the axial direction, a second plain bearing 36b which is attached to (pushed into) an annular recess 32b formed at the inner circumference surface of the cylindrical yoke 14b in the vicinity of the housing bottom surface 14c is provided, and the movable core 22 is slidably supported by the second plain bearing 36b along the axial direction. In addition, the movable core 22 may be integrally molded with a shaft 40b of a spool 40 (described below).

In the longitudinal section shown in FIG. 2, the first plain bearing 36a and the second plain bearing 36b are composed of the same annular body. For example, this annular body may be a bearing composed by laminating an outer diameter layer (a back metal layer) made of a metal material such as a SPCC (Japanese Industrial Standards), etc., a sintered bronze layer (an intermediate layer) made by sintering a bronze, etc., and a resin layer (an internal diameter layer) which is a sliding surface to the movable core 22 and is made of a resin material such as Polytetrafluoroethylene resin, etc. For example, this bearing may be a sliding bearing having a self-lubricity, and can enhance the wear resistance by using the sliding bearing having such a self-lubricity.

By providing the back metal layer on the outer diameter side of the first plain bearing 36a and the second plain bearing 36b, a magnetic path is formed by the magnetic flux which is generated when current is supplied to the coil 26. In this way, a preferable magnetic property can be obtained. In addition, for example, the first plain bearing 36a and the second plain bearing 36b may be entirely made of a metal material, a resin material, or a ceramic material, or are made by laminating these materials appropriately.

Internal diameter surfaces of the first plain bearing 36a and the second plain bearing 36b which slidingly contact the outer circumference surface of the movable core 22 are provided to be projected from the inner circumference surface of the cylindrical yoke 14b by a predetermined length T in the radial direction (see FIG. 2). Therefore, the movable core 22 slidingly contacts only the first plain bearing 36a and the second plain bearing 36b, and a gap 37 corresponding to the projection length (the predetermined length T) is formed in the radial direction between the inner circumference surface of the cylindrical yoke 14b and the outer circumference surface of the movable core 22. This gap 37 functions as a magnetic gap in the radial direction between the movable core 22 and the cylindrical yoke 14b.

In addition, at regions adjacent to first and second annular recesses 32a and 32b of the cylindrical yoke 14b into which the first and second plain bearings 36a and 36b are pushed, a tapering surface 39 which functions as a guiding surface when the first plain bearing 36a and the second plain bearing 36b are attached to the cylindrical yoke 14b respectively is formed.

In this way, by the first and second plain bearings 36a and 36b arranged on the same cylindrical yoke 14b, both ends of the movable core 22 can be slidably supported. As a result, a straight traveling stability of the movable core 22 can be obtained, the cylindrical yoke 14b can be made coaxial with the movable core 22 easily, and the hysteresis property of the linear solenoid portion 12 can be enhanced. With respect to this point, detailed explanation will be given below.

Although the first and second plain bearings 36a and 36b which are formed separately from the cylindrical yoke 14b are arranged at both ends of the cylindrical yoke 14b respectively along the axial direction in this embodiment, for example, an annular convex portion (not shown) which projects from the inner circumference surface of the cylindrical yoke 14b toward the movable core 22 by the predetermined length T may be integrally formed with the cylindrical yoke 14b. Also, conversely, an annular convex portion (not shown) which projects toward the cylindrical yoke 14b by the predetermined length T may be integrally formed with the outer circumference surface of the movable core 22.

At an end face of the movable core 22 which is opposed to the fixed core 20, the nonmagnetic plate 38 which is made of a nonmagnetic material and has a function to prevent the movable core 22 from being kept to be absorbed by the fixed core 20 through the influence of the residual magnetism when coil 26 is deenergized (affixing protecting function) is provided so as to abut on the end face. As shown in FIG. 3, at the nonmagnetic plate 38, a plurality of windows 42 which communicate with the fluid passage holes 30a and 30b of the movable core 22 are formed. The nonmagnetic plate 38 is turnably attached to an edge of the shaft 40b of the spool 40 (described below), and is provided so as to be integrally displaced with the spool 40.

In this case, by turning on a power supply (not shown) so as to supply current to the coil 26, an excitation effect is caused and the movable core 22 is displaced integrally toward the fixed core 20 by the excitation effect, thereby making the spool 40 (described below) to be operated (forward-backward movement).

Returning to FIG. 1, the valve operating mechanism 16 comprises an inlet port 44, an outlet port 46, a valve body 18 which is provided with drain ports 48, 50 respectively, and a spool (a valve element) 40 which abuts on an end face of the movable core 22 of the linear solenoid portion 12 and is pushed into by the movable core 22 so as to be slidably arranged along a space within the valve body 18.

In addition, the drain port 50 takes in and discharges the pressure oil within the housing 14 in accordance with the forward-backward movement of the movable core 22. Also, the inlet port 44, the outlet port 46, and the drain port 48 function as a plurality of ports through which the pressure fluid passes.

The spool 40 has a valve, and the valve is composed of a land portion 40a having a plurality of lands which is formed to radially extend outward, and a shaft 40b which is slidably inserted into the through hole of the fixed core 20 and one end of which abuts on the end face of the movable core 22. In addition, the end face of the movable core 22 abuts on the edge of the shaft 40b of the spool 40, and the nonmagnetic plate 38 is fixed to the edge.

Also, on the outer circumference surface of the spool 40, an annular recess 52 which communicates the inlet port 44 with the outlet port 46 or communicate the outlet port 46 with the drain port 48 in accordance with a displaced position of the spool 40 is formed.

Further, as shown in FIG. 1, the valve operating mechanism 16 has a block member 54 which is arranged to be opposed to the end face of the spool 40 so as to block the space of the valve body 18, and a return spring 56 which is interposed between the spool 40 and the block member 54 and restores the spool 40 to its original position. In addition, on the outer circumference surface of the block member 54, a seal ring 58 to keep an attached portion liquid-tight or air-tight via an annular groove is provided.

For example, the inlet port 44 is connected to a hydraulic pressure source (a pressure fluid supply source) such as a hydraulic pump (not shown), etc., respectively via a supply hydraulic passage, the outlet port 46 is connected to a hydraulic pressure operation unit of a hydraulic equipment (not shown) via an output hydraulic passage, and the drain port 48 is connected to a reservoir tank (not shown). In addition, this embodiment is explained using the pressure oil, but not limited to this. For example, a pressure fluid including compressed air or the like may be used as an operational media.

The oil pressure control unit 10 according to this embodiment is basically constituted as described above. Next, an explanation will be given on operations and operational effects of the oil pressure control unit 10.

First, attaching operation of the first and second plain bearings 36a and 36b to the cylindrical yoke 14b of the housing 14 will be explained based on FIG. 5.

Figure 5A:
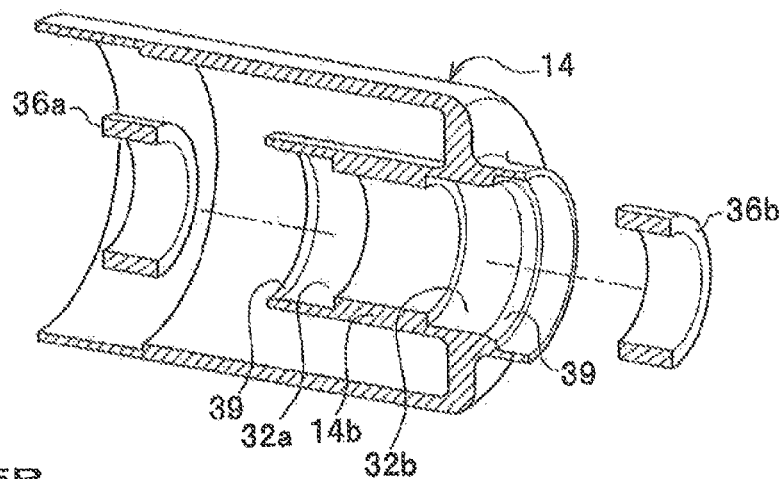
FIGS. 5A-5C are schematic diagrams showing a process of attaching a plain bearing, etc., to a cylindrical yoke.
Figure 5B:
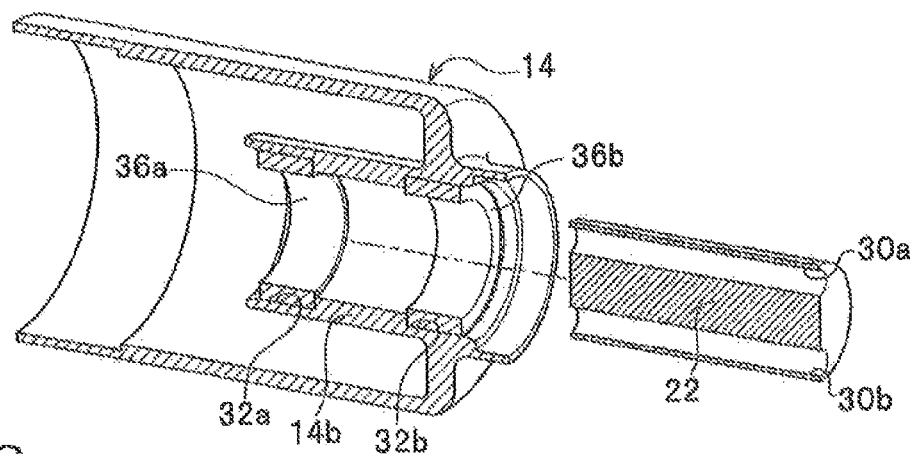
Figure 5C:
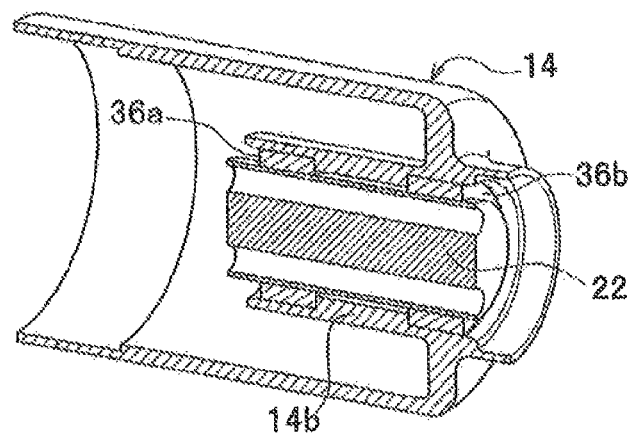

The first plain bearing 36a and the second plain bearing 36b are arranged at both ends of the cylindrical yoke 14b respectively along the axial direction (see FIG. 5A), the first plain bearing 36a and the second plain bearing 36b are slid along the tapering surface 39 which functions as a guiding surface, and the first plain bearing 36a and the second plain bearing 36b are pressed in a lateral direction of FIG. 5 to be pushed into the internal diameter surfaces of the first annular recess 32a and the second annular recess 32b whose diameters are slightly smaller than maximum outer diameters of the first plain bearing 36a and the second plain bearing 36b (see FIG. 5B). After the first plain bearing 36a and the second plain bearing 36b are pushed into the first annular recess 32a and the second annular recess 32b, the movable core 22 is inserted into the space within the ring-shaped first and second plain bearings 36a and 36b (see FIG. 5C).

In this way, according to this embodiment, by pushing the first plain bearing 36a and the second plain bearing 36b from both ends of the cylindrical yoke 14b respectively along the axial direction, the first plain bearing 36a and the second plain bearing 36b can be attached to the first annular recess 32a and the second annular recess 32b at both ends of the cylindrical yoke 14b in the axial direction easily, the assembling operation can be facilitated, and the assembly performance can be enhanced.

In addition, as shown in FIG. 4, an opening at the side of the cylindrical projection 14d of the housing 14 can be blocked easily by pressing the thin swaging portion 14e inwardly with the disc cap 19 being abutted on the cylindrical projection 14d.

Next, operation of the oil pressure control unit 10 will be explained.

As shown in FIG. 1, when the linear solenoid portion 12 is deenergized, because any electromagnetic force (any electromagnetic propelling force) of the linear solenoid portion 12 is not generated, the spool 40 is pushed toward the linear solenoid portion 12 by the spring force of the return spring 56.

Therefore, as shown in FIG. 1, in the off state of the linear solenoid portion 12, the inlet port 44 communicates with the outlet port 46 through the annular recess 52 formed on the outer circumference surface of the spool 40 (see the arrow in FIG. 1) and the pressure oil which is taken in through the inlet port 44 is supplied to other member (not shown) through the annular recess 52 and the outlet port 46.

As described above, in the off state of the linear solenoid portion 12, the movable core 22 is at the original position without any displacement and is in a normal open state where the inlet port 44 communicates with the outlet port 46.

Next, when a power supply (not shown) supplies current to the linear solenoid portion 12, the linear solenoid portion 12 is switched to ON state. In the ON state, as shown in FIG. 6, an electromagnetic force in proportion to the current value supplied to the coil 26 allows the movable core 22 to slide along the first plain bearing 36a and the second plain bearing 36b and attracts the movable core 22 toward the fixed core 20, and then the movable core 22 stops at the displacement terminal position which abuts on the recess 20a of the fixed core 20.

That is, the displacement of the movable core 22 caused by the excitation effect of the linear solenoid portion 12 is transmitted to the spool 40, and the spool 40 is displaced toward the block member 54 while moving against the spring force of the return spring 56.

Figure 6:
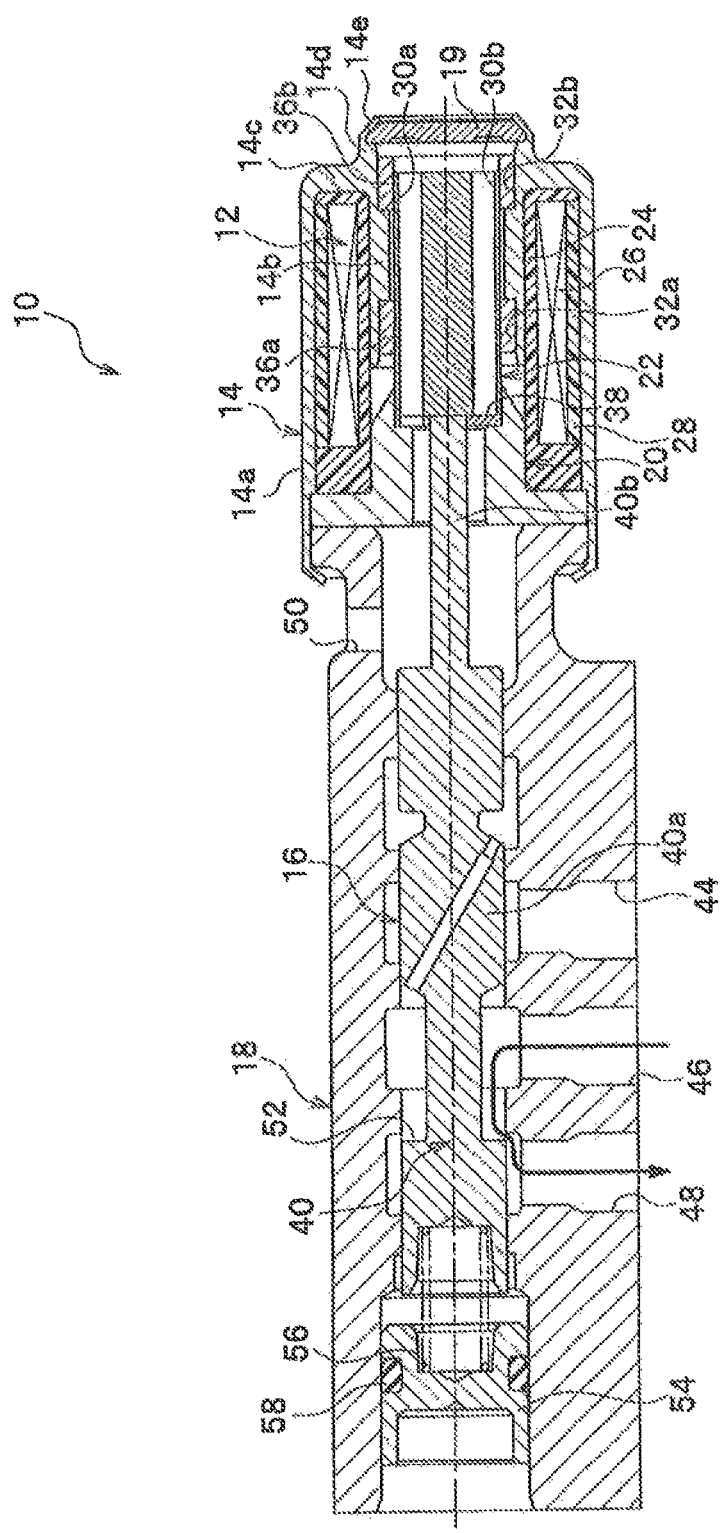
FIG. 6 is a longitudinal cross-sectional view showing that the linear solenoid portion shown in FIG. 1 in an off state is energized so as to switch a valve position of the spool.

Therefore, as shown in FIG. 6, the communication state between the inlet port 44 and the outlet port 46 is interrupted by the lands of the spool 40, and the annular recess 52 formed on the outer circumference surface of the spool 40 switches the valve position to communicate the outlet port 46 with the drain port 48.

As a result, the outlet port 46 communicates with the drain port 48 through the annular recess 52 formed on the outer circumference surface of the spool 40 (see the arrow in FIG. 6) and the pressure oil which remains in the outlet port 46 is properly discharged from the drain port 48.

In this embodiment, by providing a shaft-less structure having no conventional shaft to a movable core 22, magnetic flux density saturation of the movable core 22 can be reduced compared to a conventional structure having a shaft. As a result, the present invention can reduce the outer diameter and/or an axial length of the movable core 22 so as to miniaturize the movable core 22, resulting in miniaturization of the entire linear solenoid portion 12.

Also, in this embodiment, the first plain bearing 36a and the second plain bearing 36b are arranged at both ends of a cylindrical yoke 14b along an axis of the cylindrical yoke 14b respectively, and the movable core 22 can be made coaxial with the cylindrical yoke 14b easily. By making the movable core 22 coaxial with the cylindrical yoke 14b, a side force (a force to attract the movable core 22 outwardly in a radial direction) can be decreased, and a preferable hysteresis property can be obtained.

Further, in this embodiment, a magnetic gap which is a gap 37 in a radial direction between the cylindrical yoke 14b and the movable core 22 can be provided with ease and high accuracy. For example, by setting a recess depth of the first annular recess 32a and the second annular recess 32b into which the first plain bearing 36a and the second plain bearing 36b are pushed properly, or by setting a thickness of the first plain bearing 36a and the second plain bearing 36b properly, the internal diameter surface of the first plain bearing 36a and the second plain bearing 36b can set the projection length (the predetermined length T) projecting from the inner circumference surface of the cylindrical yoke 14b in the radial direction easily. As a result, in this embodiment, the magnetic gap can be minimized and the attractive force to the movable core 22 can enhanced.

Further, in this embodiment, as described above, by making the movable core 22 coaxial with the cylindrical yoke 14b, the attractive force to the movable core 22 can be increased, and the hysteresis property can be enhanced. Still further, in this embodiment, because the movable core 22 overlaps with only the first and second plain bearings 36a and 36b partially, a sliding resistance can be significantly decreased and the hysteresis property can be further enhanced.

Figure 7A:
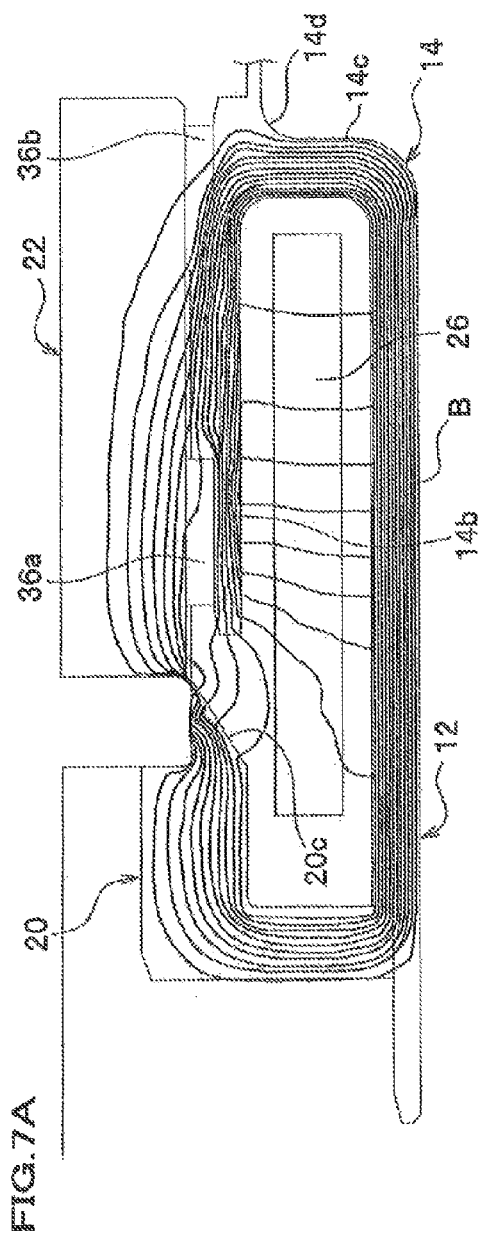
FIG. 7A is a schematic diagram showing a magnetic flux flow generated in the linear solenoid portion when the movable core is in an initial state.
Figure 7B:
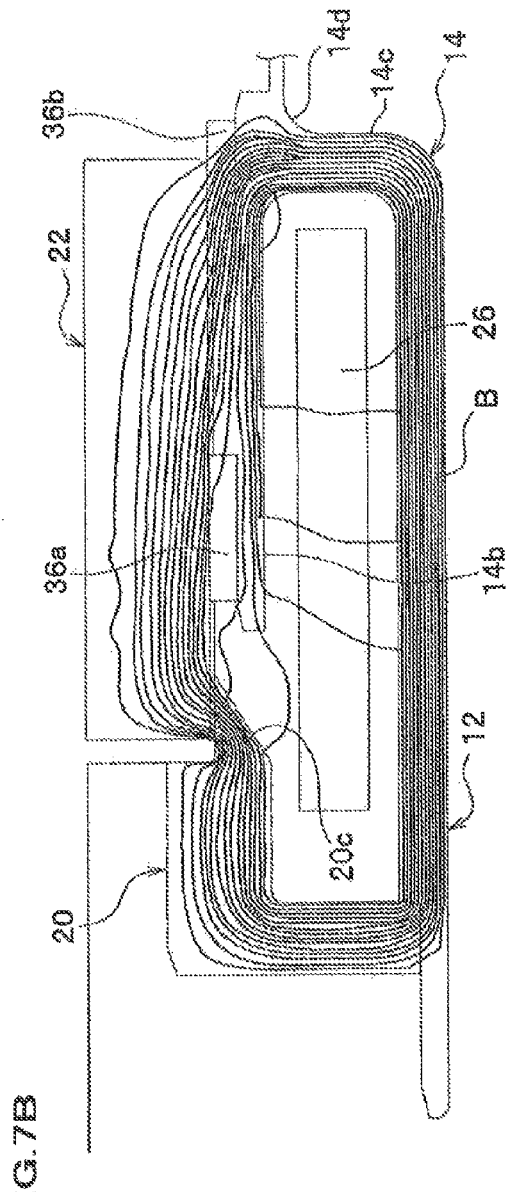
FIG. 7B is a schematic diagram showing a magnetic flux flow generated in the linear solenoid portion when the movable core is at a displacement terminal position on the fixed core side.

Still further, in this embodiment, as shown in FIG. 2, by arranging one end of the movable core 22 which faces to a housing bottom surface 14c so as to intersect a dashed line (a line) A which is approximately orthogonal to the axis of the movable core 22 and passes through the center (a thick central portion along the axial direction) of the housing bottom surface 14c, a magnetic flux flow B which flows toward the movable core 22 from the housing bottom surface 14c whose axial thickness is thicker than a radial thickness of a cylindrical portion provided on an outmost surface of the housing can be made to be preferable (see FIGS. 7A and 7B). As a result, in this embodiment, the magnetic flux density caused by the excitation effect of the linear solenoid portion 12 can be increased and the attractive force to the movable core 22 can be enhanced. In addition, arranging one end of the movable core 22 so as to intersect the line means that arranging the movable core 22 so that any portion of one end of the movable core 22 intersects the dashed line A.

FIG. 7A is a schematic diagram showing a magnetic flux flow generated in the linear solenoid portion when the movable core is in an initial state, and FIG. 7B is a schematic diagram showing a magnetic flux flow generated in the linear solenoid portion when the movable core is at a displacement terminal position on the fixed core side.

In this embodiment, as shown in FIG. 2, the second plain bearing 36b is arranged to be approximately orthogonal to the axis of the movable core 22 and to intersect the dashed line (the line) A passing through the center (the thick central portion along the axial direction) of the housing bottom surface 14c. In this case, as shown in FIGS. 7A and 7B, a partial magnetic flux flow B caused by the excitation effect passes through the outer diameter layer (the back metal layer) of the second plain bearing 36b, and the second plain bearing 36b can be prevented from causing the obstruction to the magnetic flux flow B. As a result, in this embodiment, miniaturization of the linear solenoid portion 12 achieved by shortening the axial length of the movable core 22 and enhancement of the attractive force of the movable core 22 achieved by increase in the generated magnetic flux density can go together. In addition, arranging one end of the movable core 22 so as to intersect the dashed line means arranging the second plain bearing 36b so that any portion of the second plain bearing 36b intersects the dashed line A.

In addition, in this embodiment, two bearings composed of the first plain bearing 36a and the second plain bearing 36b slidably support the movable core 22, but not limited to this. The movable core 22 may be supported by at least one or more bearings.

Next, an oil pressure control unit 110 in which a linear solenoid according to other embodiment of the present invention is incorporated is shown in FIGS. 8-14. In addition, in the embodiment described below, the same numerical references as those of embodiment shown in FIGS. 1-7 are used for the same components, and detailed explanation will be omitted.

Figure 8:
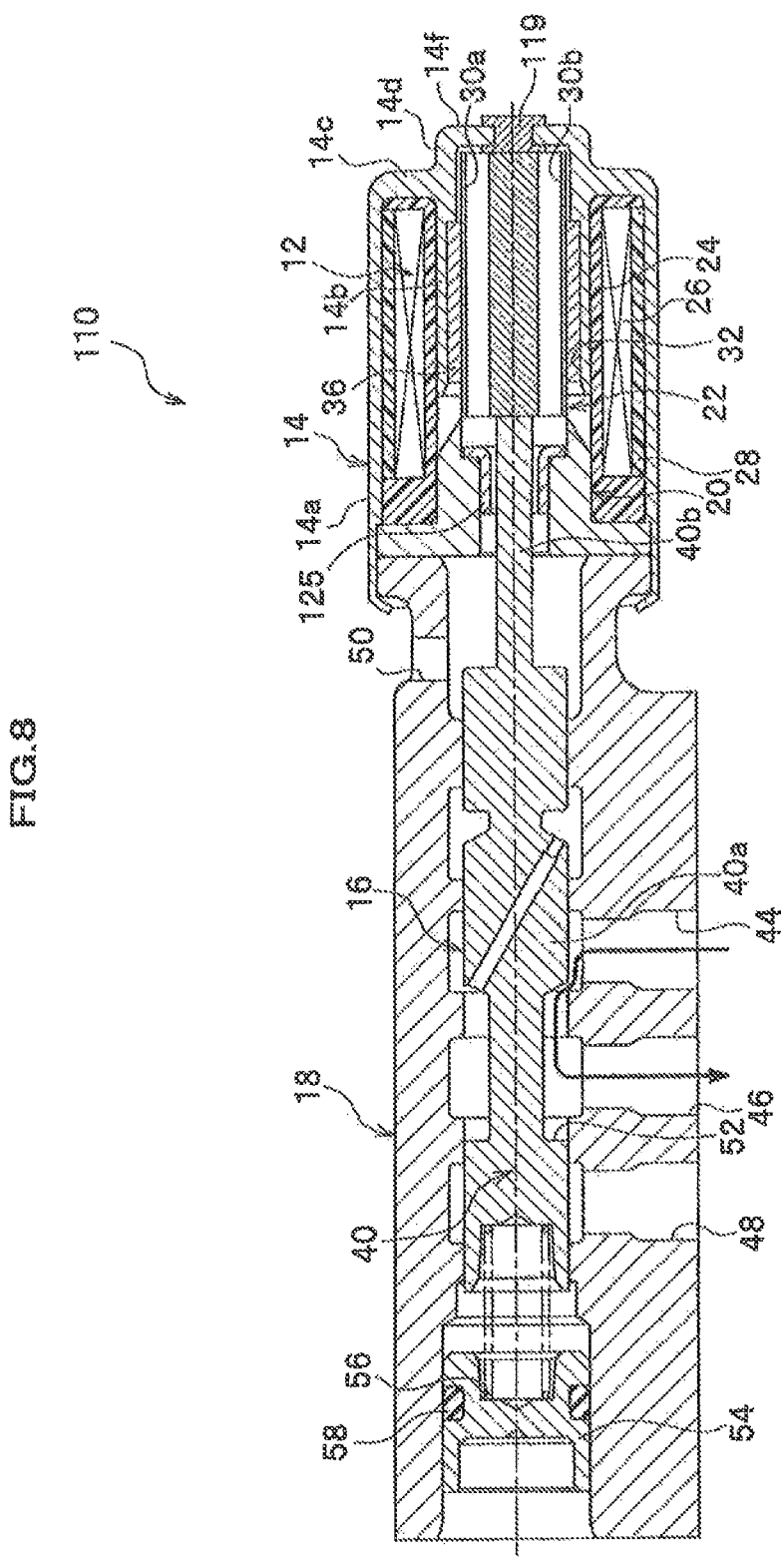
FIG. 8 is a longitudinal cross-sectional view of an oil pressure control unit, in which a linear solenoid according to other embodiment of the present invention is incorporated, along the axial direction.
Figure 9:
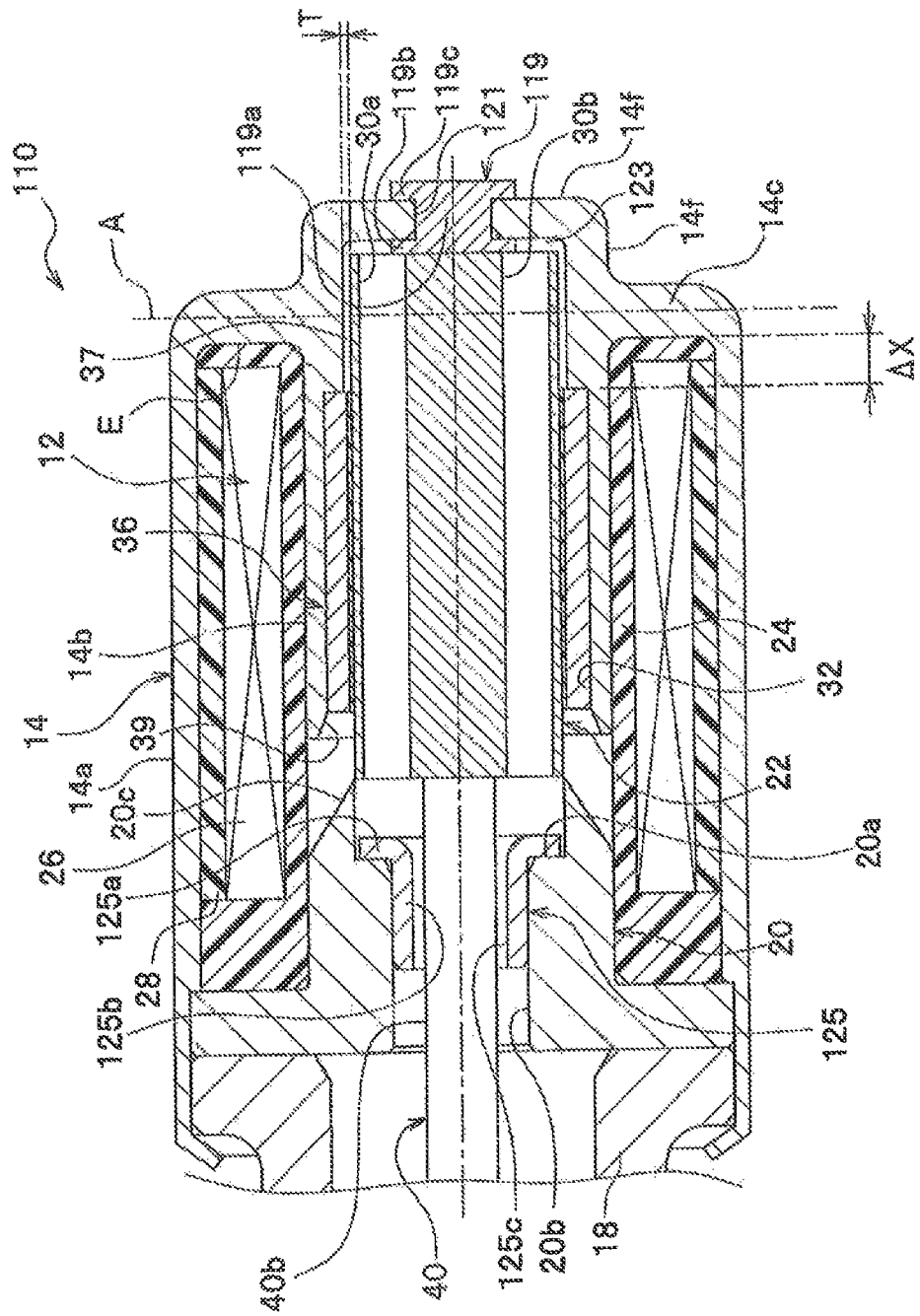
FIG. 9 is an enlarged longitudinal cross-sectional view of the linear solenoid portion of the oil pressure control unit shown in FIG. 8.

As shown in FIGS. 8 and 9, in the oil pressure control unit 110, the housing 14 has a cylindrical projection 14d which continued to the housing bottom surface 14c and extends approximately parallel to the cylindrical portion 14a, and a thick projecting bottom portion 14f which extends from the cylindrical projection 14d and to an approximate center of which a first stopper 119 (described below) is fixed. In this case, the cylindrical portion 14a, the cylindrical yoke 14b, the housing bottom surface 14c, the cylindrical projection 14d, and the projecting bottom portion 14f are integrally formed.

Figure 10A:
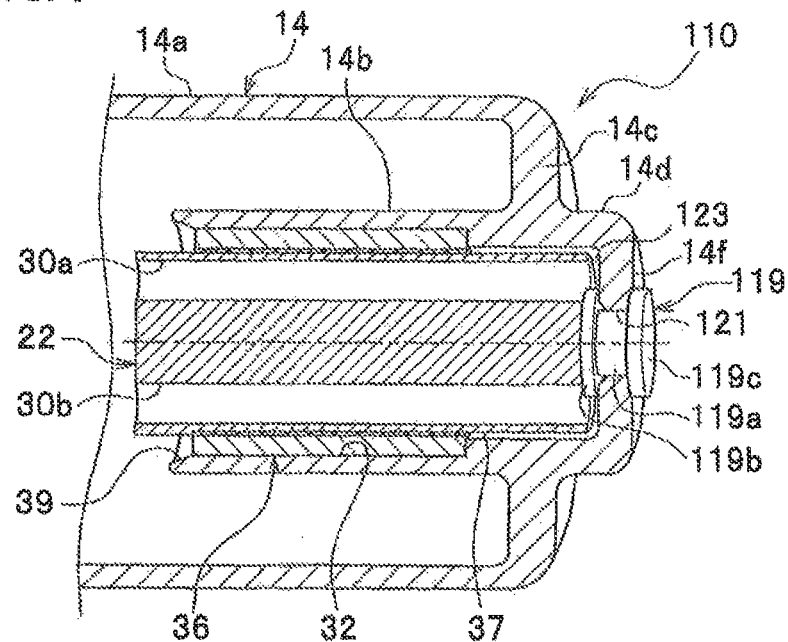
FIG. 10A is an enlarged longitudinal cross-sectional perspective view showing that the movable core abuts on a first stopper.

As shown in FIGS. 9 and 10A, the first stopper 119 is composed of a nonmagnetic material member whose longitudinal section is approximately H-shaped, and functions as a stopper for limiting the displacement of the movable core 22 in one direction while one end of the movable core 22 in the axial direction abuts on the first stopper 119. The first stopper 119 is composed of a cylinder 119a which is held (or loosely fitted via a clearance) in the through hole 121 of the projecting bottom portion 14f, a disc 119b which engages with an inner wall side of the projecting bottom portion 14f, and a disc 119c which engages with an outer wall side of the projecting bottom portion 14f.

Figure 11A:
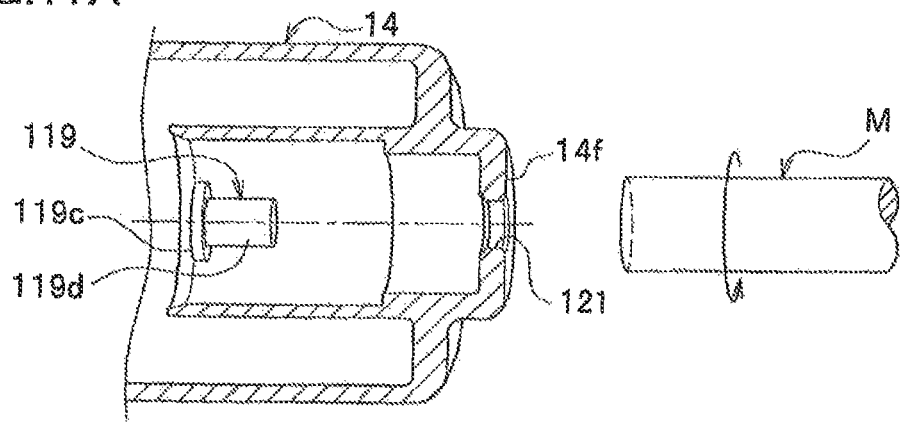
FIGS. 11A-11C are schematic diagrams showing a process for rolling swaging the first stopper to a projecting bottom portion of the housing.
Figure 11B:
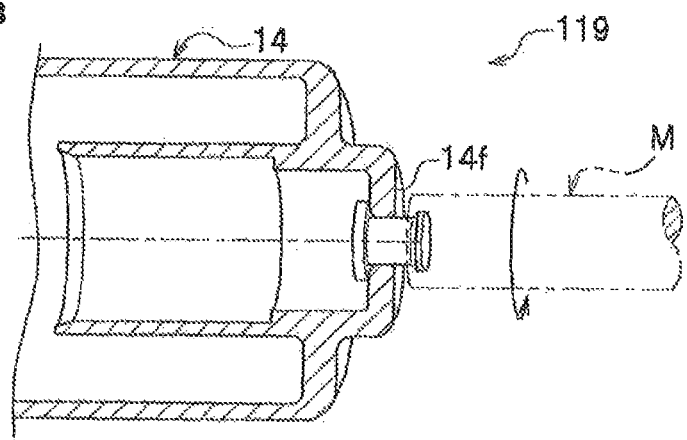
Figure 11C:
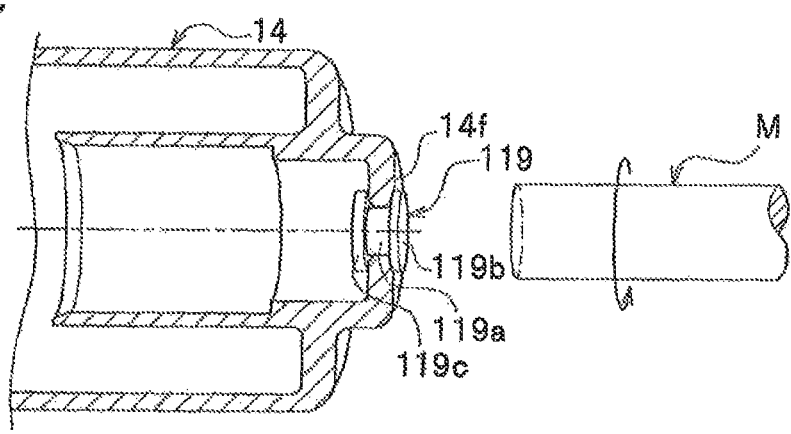

In this case, as shown in FIGS. 11A-11C, by inserting a cylindrical portion 119d of unprocessed first stopper 119 along the through hole 121 formed through the projecting bottom portion 14f of the housing 14 and by pressing the cylindrical portion 119d with a rotation axis M of a rolling swaging apparatus to plastically deform the cylindrical portion 119d, the diameter of the cylindrical portion 119d of the first stopper 119 is extended along the inner wall face of the projecting bottom portion 14f so as to form the disc 119b and the first stopper 119 is fixed to the approximate center of the projecting bottom portion 14f.

In other embodiment, the thick projecting bottom portion 14f is formed at the end of the housing 14 so as to limit the displacement of the movable core 22 in one direction via the first stopper 119 made of the nonmagnetic material fixed to the projecting bottom portion 14f. Also, by making the first stopper 119 made of the nonmagnetic material into a simple structure composed of a single component and by rolling swaging the cylindrical portion 119d passing through the through hole 121 of the projecting bottom portion 14f so as to plastically deform the cylindrical portion 119d and to manufacture with ease, the manufacturing costs can be reduces.

As shown in FIGS. 8 and 9, the linear solenoid portion 12 has the movable core 22 which displaceably arranged inside the cylindrical yoke 14b, and the second stopper 125 which is pushed into the hole 20b which continued to the recess 20a of the fixed core 20 which faces to the movable core 22 so as to limit the displacement of the movable core 22 in another direction.

Figure 10B:
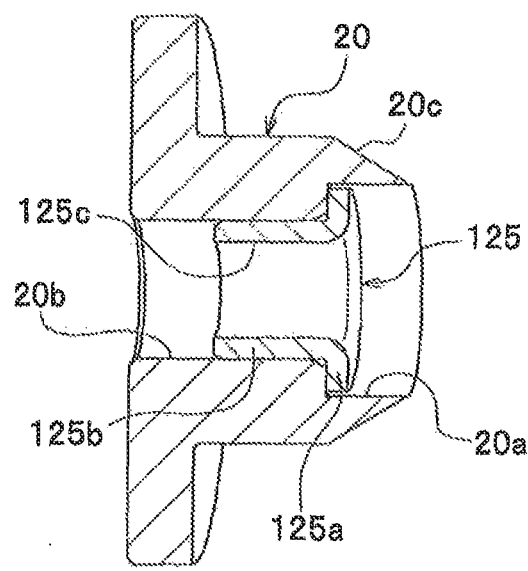
FIG. 10B is an enlarged longitudinal cross-sectional perspective view showing a second stopper is pushed into the fixed core.

As shown in FIGS. 9 and 10B, the second stopper 125 is made of the nonmagnetic material, and is composed of an annular flange 125a which engages with the recess 20a of the fixed core 20, and a cylindrical portion 125b which continues to the flange 125a and is pushed into the hole 20b of the fixed core 20. Through the cylindrical portion 125*b*, an inserting hole 125*c* into which the shaft 40*b* of the spool 40 is inserted is provided.

At an intermediate portion between both ends of the movable core 22 along the axial direction, a single plain bearing 36 which is attached to (pushed into) an annular recess 32 formed on the inner circumference surface of the cylindrical yoke 14*b* is provided, and the movable core 22 is slidably supported by the plain bearing 36 along the axial direction.

In the longitudinal section shown in FIGS. 9 and 10A, the plain bearing 36 is composed of an annular body having a constant internal diameter along the axial direction. For example, the annular body may be a bearing composed by laminating an outer diameter layer (a back metal layer) made of a metal material such as a SPCC (Japanese Industrial Standards), etc., a sintered bronze layer (an intermediate layer) made by sintering a bronze, etc., and a resin layer (an internal diameter layer) which is a sliding surface to the movable core 22 and is made of a resin material such as Polytetrafluoroethylene resin, etc. For example, this bearing may be a sliding bearing having a self-lubricity, and can enhance the wear resistance by using the sliding bearing having such a self-lubricity.

By providing the back metal layer on the outer diameter side of the plain bearing 36, a magnetic path is formed by the magnetic flux which is generated when current is supplied to the coil 26. In this way, a preferable magnetic property can be obtained.

Internal diameter surface of the plain bearing 36 which slidingly contacts the outer circumference surface of the movable core 22 is provided to be projected from the inner circumference surface of the cylindrical yoke 14*b* by a predetermined length T in the radial direction (see FIG. 9). Therefore, the movable core 22 slidingly contacts only the plain bearing 36, and a gap 37 corresponding to the projection length (the predetermined length T) is formed in the radial direction between the inner circumference surface of the cylindrical yoke 14*b* and the outer circumference surface of the movable core 22. This gap 37 functions as a magnetic gap in the radial direction between the movable core 22 and the cylindrical yoke 14*b* in the radial direction.

In this way, by the single plain bearing 36 arranged on the inner circumference surface of the cylindrical yoke 14*b*, the intermediate portion of the movable core 22 can be slidably supported. As a result, a straight traveling stability of the movable core 22 can be obtained, the cylindrical yoke 14*b* can be made coaxial with the movable core 22 easily, and the hysteresis property of the linear solenoid portion 12 can be enhanced. With respect to this point, detailed explanation will be given below.

Although the single plain bearing 36 which is formed separately from the cylindrical yoke 14*b* is arranged in the vicinity of the fixed core 20 of the cylindrical yoke 14*b* in other embodiment, for example, an annular convex portion (not shown) which projects from the inner circumference surface of the cylindrical yoke 14*b* toward the movable core 22 by the predetermined length T may be integrally formed with the cylindrical yoke 14*b*. Also, conversely, an annular convex portion (not shown) which projects toward the cylindrical yoke 14*b* by the predetermined length T may be integrally formed with the outer circumference surface of the movable core 22.

The second stopper 125 provided at the recess 20*a* of the fixed core 20 is made of a nonmagnetic material, and has a function to prevent the movable core 22 from being kept to be absorbed by the fixed core 20 through the influence of the residual magnetism when coil 26 is deenergized (affixing protecting function).

The oil pressure control unit 110 according to other embodiment is basically constituted as described above. Next, an explanation will be given on operational effects of the oil pressure control unit 110.

First, attaching operation of the plain bearing 36 to the cylindrical yoke 14*b* of the housing 14 will be explained based on FIG. 12.

Figure 12A:
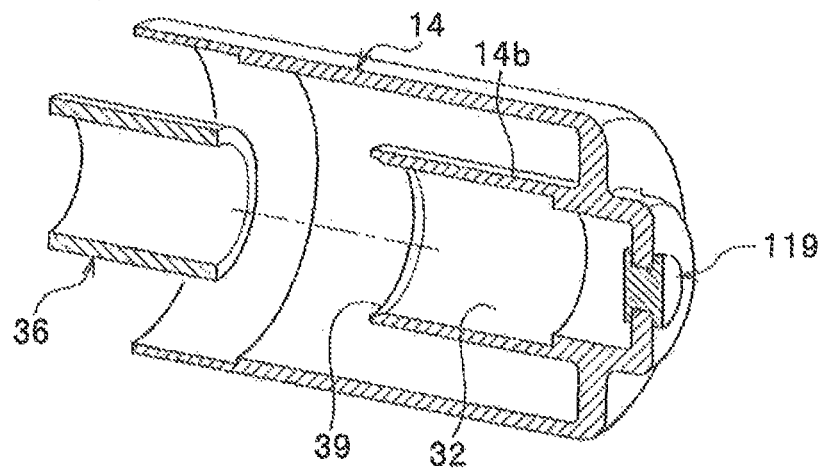
FIGS. 12A-12C are schematic diagrams showing a process of attaching the plain bearing to the cylindrical yoke.
Figure 12B:
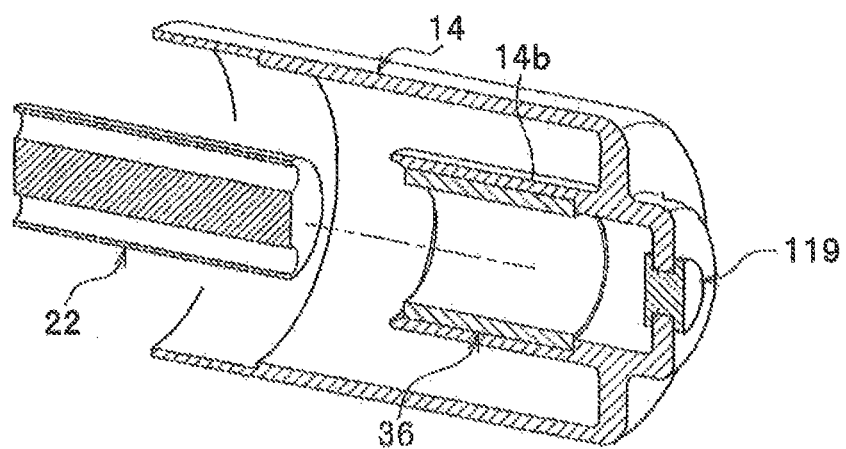
Figure 12C:
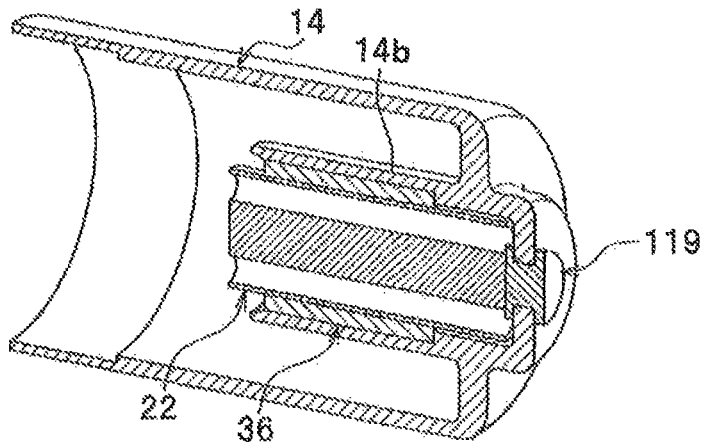

The plain bearing 36 is arranged at one end (at the side of the fixed core 20) of the cylindrical yoke 14*b* along the axial direction (see FIG. 12A), the plain bearing 36 is slid along the tapering surface 39 which functions as a guiding surface, and the plain bearing 36 is pressed in a lateral direction of FIG. 5 to be pushed into the internal diameter surface of the annular recess 32*b* whose diameter is slightly smaller than maximum outer diameter of the plain bearing 36 (see FIG. 12B). After the plain bearing 36 is pushed into the annular recess 32, the movable core 22 is inserted into the space within the ring-shaped plain bearing 36 (see FIG. 12C).

In this way, in other embodiment, by inserting the single plain bearing 36 from one end (the fixed core 20 side) of the cylindrical yoke 14*b* along the axial direction, the plain bearing 36 can be attached to the annular recess 32 formed on the internal diameter surface of the cylindrical yoke 14*b* easily, the assembling operation can be facilitated, and the assembly performance can be enhanced.

Also, in other embodiment, by providing a single annular recess 32 into which the plain bearing 36 can be inserted toward the inner circumference surface of the cylindrical yoke 14*b* only from the fixed core 20 side and not providing the annular recess 32 on the inner circumference surface of the cylindrical yoke 14*b* on the housing bottom surface 14*c* side opposite to the fixed core 20 side, the cylindrical yoke 14*b* can be integrated with the housing bottom surface 14*c*. In this case, for example, the assembling man-hours and the component count can be reduced compared to the case where a cap (not shown), etc., is provided on the housing bottom surface 14*c* side so as to block the housing bottom surface 14*c*, resulting in reduction of manufacturing costs.

Further, in other embodiment, because the single annular recess 32 is merely formed on the inner circumference surface of the cylindrical yoke 14*b*, for example, the axis of the cylindrical yoke 14*b* can be prevented from moving off the axis of the movable core 22 compared to the case where the plurality of annular recesses are provided on the inner circumference surface of the cylindrical yoke 14*b*. As a result, the cylindrical yoke 14*b* can be made coaxial with the movable core 22, and the hysteresis property can be enhanced.

Still further, in other embodiment, by making the first stopper 119 made of the nonmagnetic material into a simple structure composed of a single component and by swaging a cylindrical portion 119*d* (see FIG. 11) passing through a through hole 121 of the projecting bottom portion 14*f* with a rolling swaging apparatus M so as to plastically deform the projecting bottom portion 14*f* at an inner wall side and to manufacture with ease, the manufacturing costs can be reduces.

Figure 13:
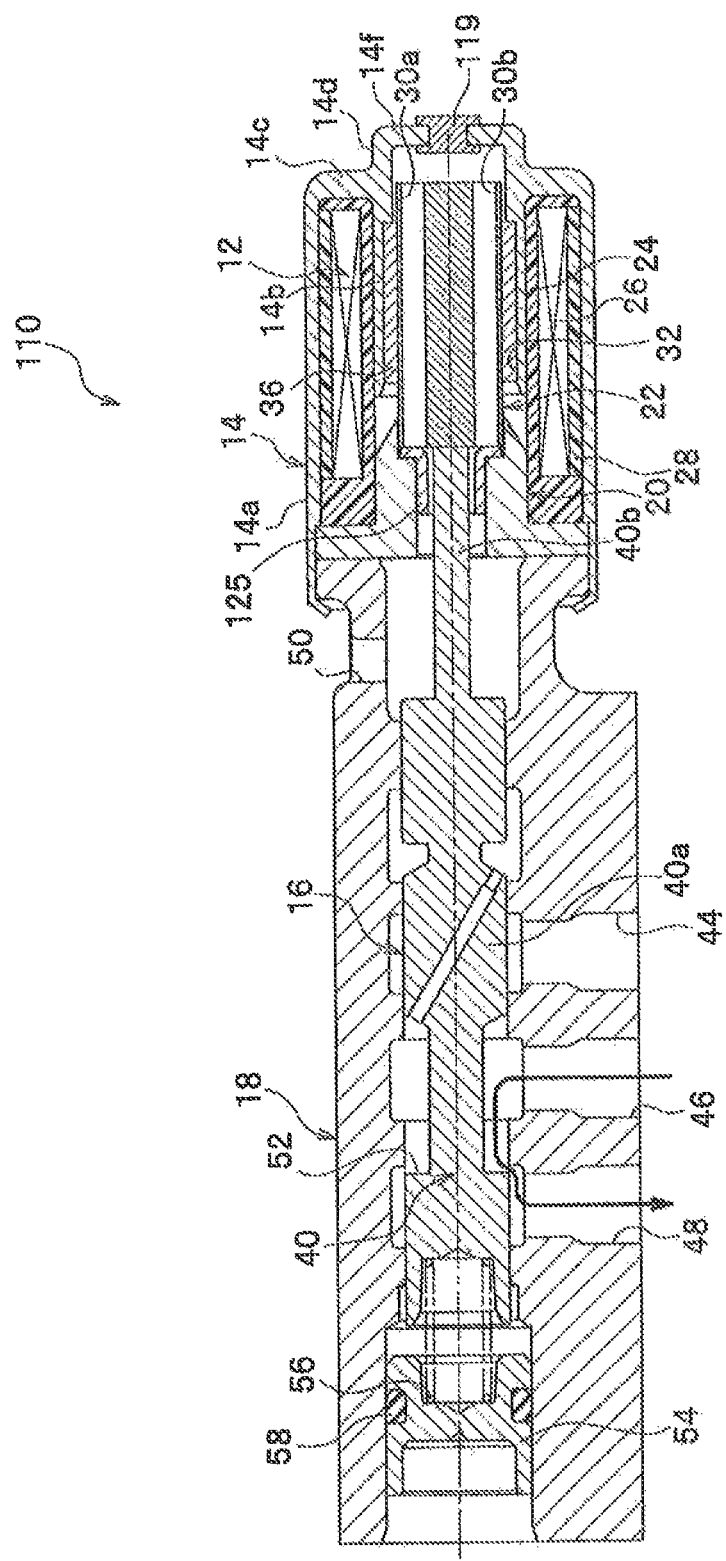
FIG. 13 is a longitudinal cross-sectional view showing that the linear solenoid portion shown in FIG. 8 in an off state is energized so as to switch a valve position of the spool.

Still further, in other embodiment, the displacement of the movable core 22 in another direction (the displacement toward the fixed core 20) can be limited via the second stopper 125 which is pushed into the hole 20*b* which continues to the recess 20*a* of the fixed core 20 (see FIG. 13). Also, displacement of the movable core 22 is transmitted to the shaft 40*b* via the inserting hole 125*c* formed at the second stopper 125 so as to move the spool 40. Further, by pushing the second stopper 125 into the hole 20b of the fixed core 20, the second stopper 125 can be surely fixed to the fixed core 20 with ease.

In other embodiment, the single plain bearing 36 is arranged at the intermediate portion between both ends of the cylindrical yoke 14b along the axial direction, the movable core 22 can be made coaxial with the cylindrical yoke 14b easily. By making the movable core 22 coaxial with the cylindrical yoke 14b, the side force (the force to attract the movable core 22 outwardly in the radial direction) can be decreased, and a preferable hysteresis property can be obtained.

Also, on other embodiment, a magnetic gap which is a gap 37 in a radial direction between the cylindrical yoke 14b and the movable core 22 can be provided with ease and high accuracy. For example, by setting a recess depth of the second annular recess 32 into which the plain bearing 36 are pushed properly, or by setting a thickness of the plain bearing 36 properly, the internal diameter surface of the plain bearing 36 can set the projection length (the predetermined length T) projecting from the inner circumference surface of the cylindrical yoke 14b in the radial direction easily. As a result, in this embodiment, the magnetic gap can be minimized and the attractive force to the movable core 22 can be enhanced.

Further, in other embodiment, as described above, by making the movable core 22 coaxial with the cylindrical yoke 14b, the attractive force to the movable core 22 can be increased, and the hysteresis property can be enhanced. Still further, in this embodiment, because the movable core 22 overlaps with only the plain bearing 36 partially, a sliding resistance can be significantly decreased and the hysteresis property can be further enhanced.

Further, in other embodiment, by arranging the single plain bearing 36 at the intermediate portion of cylindrical yoke 14b along the axial direction so as not to intersect a dashed line A which is approximately orthogonal to the axis of the movable core 22 and passes through the center (a thick central portion along the axial direction) of the housing bottom surface 14c as shown in FIG. 9, the magnetic flux which flows from the housing bottom surface 14c toward the movable core 22 can be preferably prevented from being obstructed by the plain bearing 36, and the magnetic flux flow which flows from the housing bottom surface 14c toward the movable core 22 can be made to be preferable.

Still further, in other embodiment, by arranging the single plain bearing 36 at the intermediate portion of the cylindrical yoke 14b along the axial direction where the intermediate portion is displaced by a predetermined distance $\Delta X$ in an approximately horizontal direction from an inside bottom surface E of the housing 14 toward the fixed core 20 as shown in FIG. 9, the magnetic flux which flows from the housing bottom surface 14c toward the movable core 22 can be preferably prevented from being obstructed by the plain bearing 36, and the magnetic flux flow which flows from the housing bottom surface 14c toward the movable core 22 can be made to be more preferable.

FIG. 14A is a schematic diagram showing a magnetic flux flow generated in the linear solenoid portion when the movable core abuts the first stopper and is at an initial state, and FIG. 14B is a schematic diagram showing a magnetic flux flow generated in the linear solenoid portion when the movable core is at a displacement terminal position on the fixed core side.

Because the single plain bearing 36 is arranged at the part where the part is displaced by a predetermined distance $\Delta X$ in an approximately horizontal direction from the inside bottom surface E of the housing 14 toward the fixed core 20 (see FIG. 9), when the magnetic flux flows from the housing bottom surface 14c toward the movable core 22 as shown in FIGS. 14A and 14B, a smooth magnetic flux flow B can be obtained without the plain bearing 36 being an obstruction to the magnetic flux flow B (see portions indicated by "C" in FIG. 14).

Therefore, in other embodiment, the magnetic flux density caused by the excitation effect of the linear solenoid portion 12 can be increased and the attractive force to the movable core 22 can be enhanced. As a result, in other embodiment, miniaturization of the linear solenoid portion 12 achieved by shortening the axial length of the movable core 22 and enhancement of the attractive force of the movable core 22 achieved by increase in the generated magnetic flux density can go together. In addition, by making the bearing for slidably supporting the movable core 22 into a single component, the component count is reduced, resulting in cost-cutting.

Next, an oil pressure control unit 210 in which a linear solenoid according to still other embodiment of the present invention is incorporated is shown in FIGS. 15-18.

Figure 15:
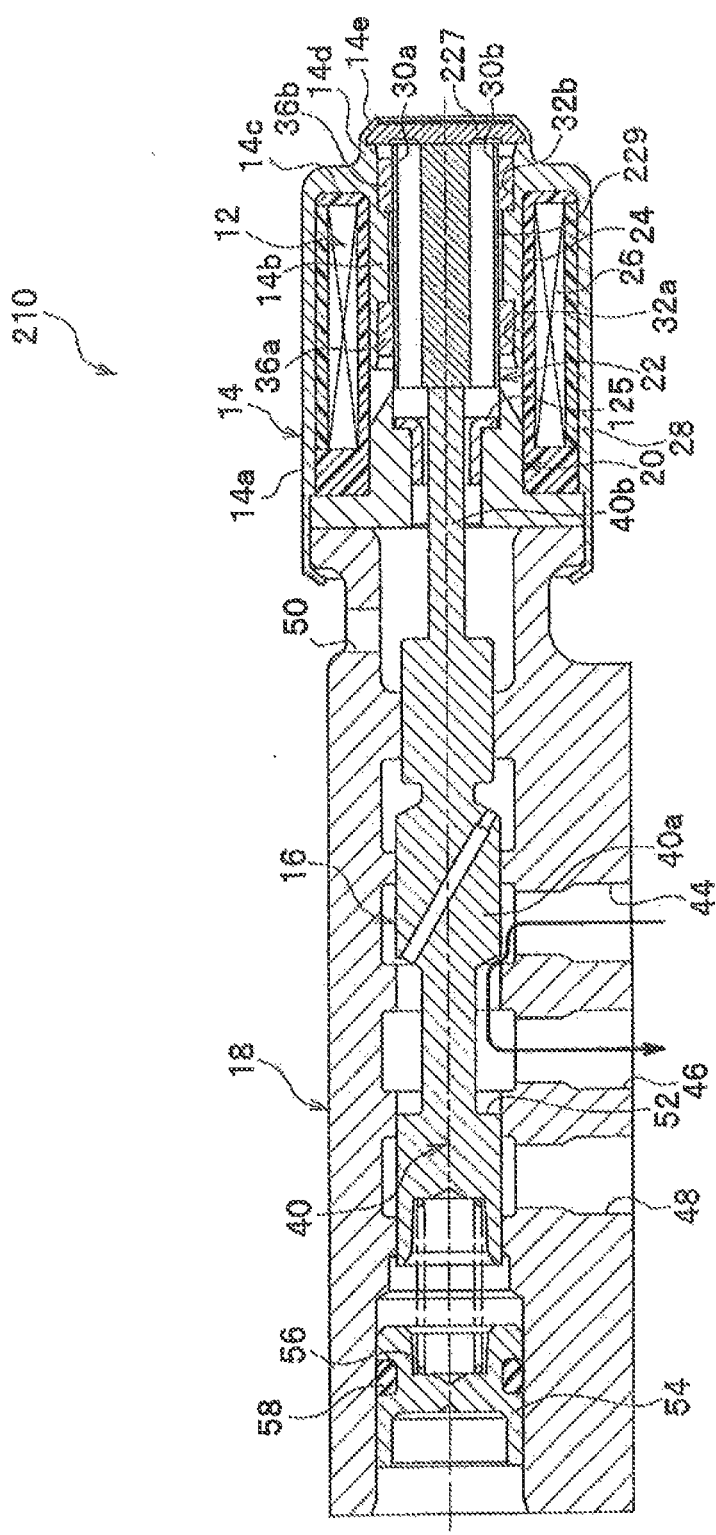
FIG. 15 is a longitudinal cross-sectional view of an oil pressure control unit, in which a linear solenoid according to still other embodiment of the present invention is incorporated, along the axial direction.
Figure 16:
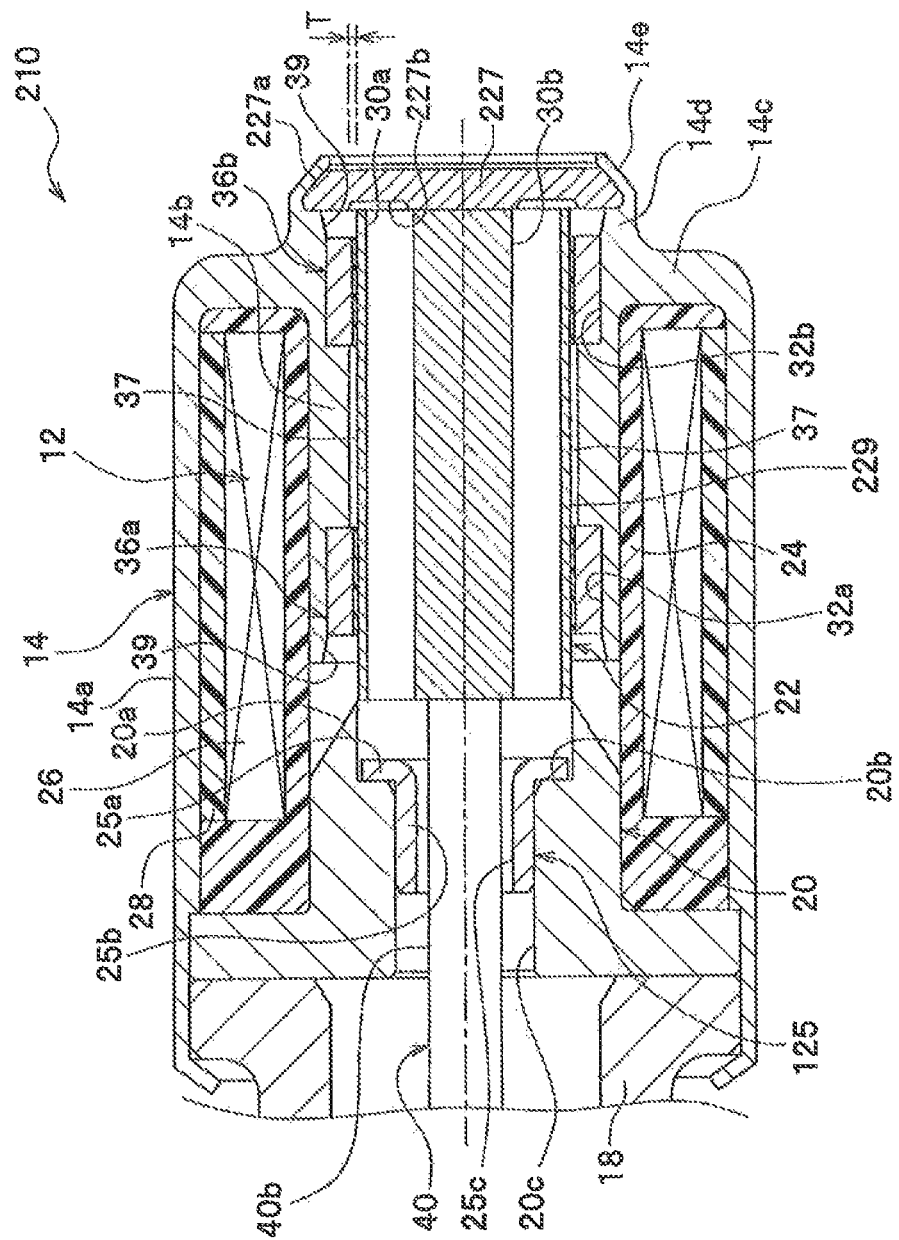
FIG. 16 is an enlarged longitudinal cross-sectional view of the linear solenoid portion of the oil pressure control unit shown in FIG. 15.

As shown in FIGS. 15 and 16, the housing 14 of an oil pressure control unit (a valve device) 210 has a cylindrical projection 14d which continues from the housing bottom surface 14c and extends approximately parallel to the cylindrical portion 14a, and a thin swaging portion 14e which extends from the cylindrical projection 14d and swages a first stopper 227 (described below) so as to hold it. In this case, the cylindrical portion 14a, the cylindrical yoke 14b, the housing bottom surface 14c, the cylindrical projection 14d, and the swaging portion 14e are integrally formed.

As shown in FIGS. 15 and 16, the linear solenoid portion 12 has a cylindrical yoke 14b which is integrally formed with the housing 14 at an blocked end of the housing 14 and is provided within the coil assembly, a fixed core 20 which is connected to an open end of the cylindrical portion 14a and is arranged inside the coil assembly along the axial direction via the cylindrical yoke 14b and a predetermined clearance, and the movable core 22 which is displacably arranged inside the cylindrical yoke 14b, and a nonmagnetic second stopper 125 which limits the displacement of the movable core 22 to the side of the fixed core 20 (in the another displacement direction).

At the opposite end of the movable core 22 which opposed to the second stopper 125 along the axial direction, a nonmagnetic first stopper 227 to limit the displacement in a direction to be spaced apart from the fixed core 20 of the movable core 22 (the displacement in one direction) is provided.

As shown in FIG. 16, the first stopper 227 is a disc member made of the nonmagnetic material, and a tapering surface 227a is formed on an outer circumference surface which is held by the swaging portion 14e of the housing 14. Also, on an inner wall face of the first stopper 227 which is opposed to the movable core 22, an annular groove 227b which makes one fluid passage hole 30a of the movable core 22 communicate with other fluid passage hole 30b is formed.

Figure 4A:
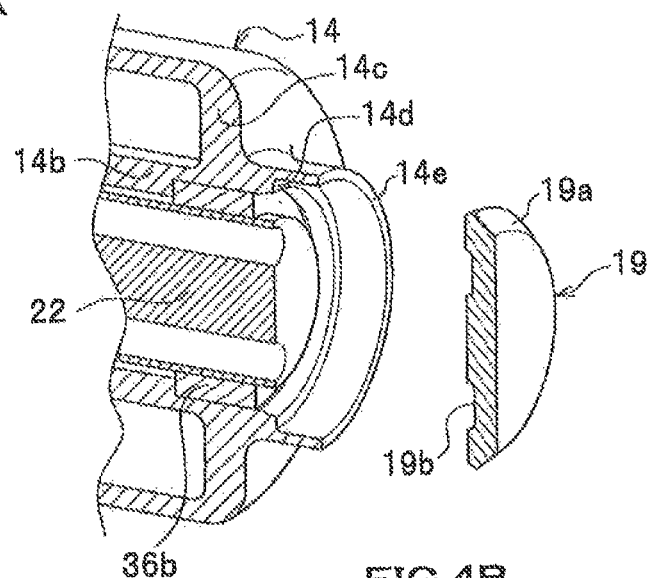
FIGS. 4A-4C are schematic diagrams showing a process for swaging a cap to a cylindrical projection of a housing.
Figure 4B:
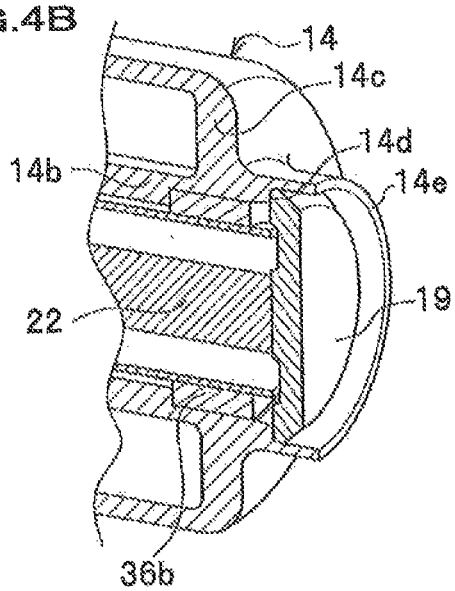
Figure 4C:
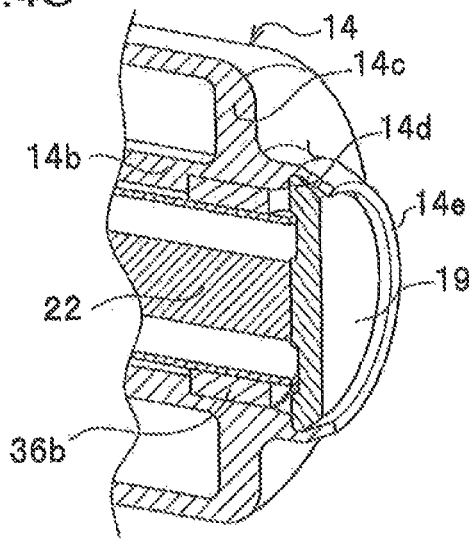

In this case, like FIGS. 4A-4C, the cylindrical projection 14d (the housing 14) is blocked by inserting the first stopper 227 along the swaging portion 14e of the housing 14 so that the first stopper 227 abuts the cylindrical projection 14d and pressing the thin swaging portion 14e inwardly to be bent by a pressing means (not shown).

In still other embodiment, by forming the cylindrical projection 14d on the housing 14 and making the disc first stopper 227 to block the cylindrical projection 14d with a nonmagnetic material, a space in the housing 14 in which the movable core 22 is provided can be prevented from intrusion of contamination easily, and the movable core 22 can be prevented from being affixed to the first stopper 227.

Figure 17:
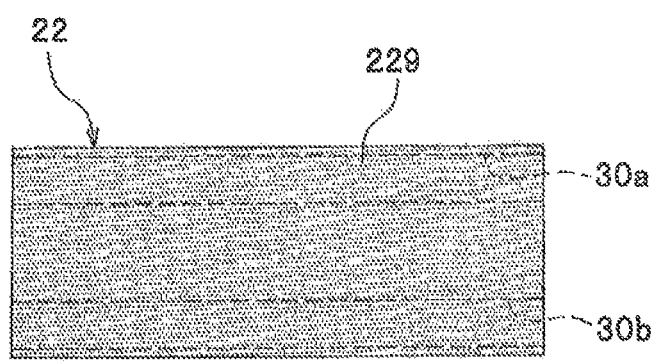
FIG. 17 is a side view of the movable core, on whose outer surface a hard layer is formed.
Figure 18:
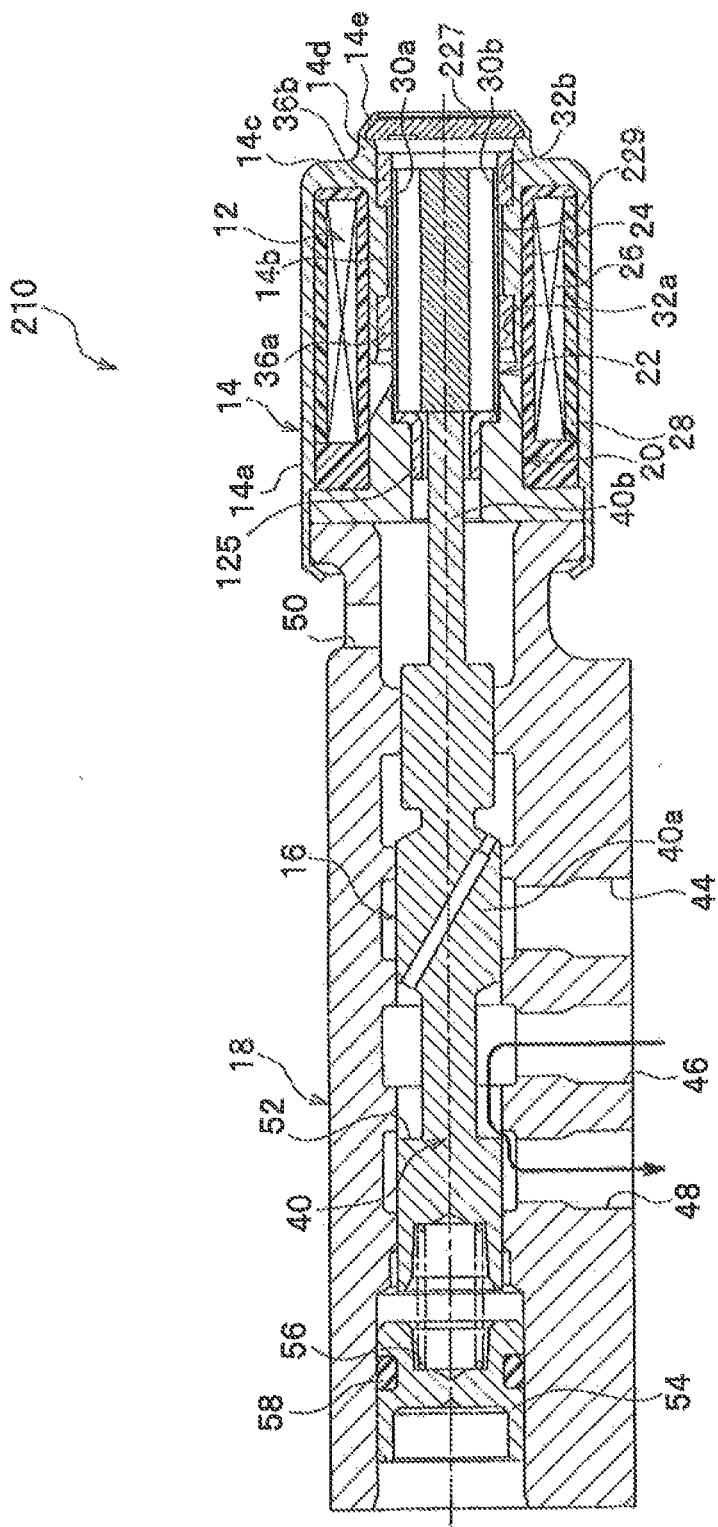
FIG. 18 is a longitudinal cross-sectional view showing that the linear solenoid portion shown in FIG. 15 at an off state is energized so that the movable core is displaced and abuts on the first stopper.

As shown in FIG. 17, the movable core 22 is composed of a shaft-less cylindrical body without a conventional shaft passing through its center portion. On the whole outer surface of the cylindrical body, a hard layer 229 which has a predetermined thickness, is formed by the NiP plating (e.g., Kanigen plating, registered trademark), etc., and is harder than the inside of the movable core 22 is provided. Also, the cylindrical body is provided with a plurality of fluid passage holes 30a and 30b which are spaced apart by about 180 degrees in the circumferential direction and pass through the movable core 22 along the axial direction. Through the fluid passage holes 30a and 30b, a pressure oil at one end of the movable core 22 along the axial direction can communicate with a pressure oil at another end.

By forming the hard layer 229 with, e.g., NiP plating, the hard layer 229 having high hardness can be easily and inexpensively obtained. Also, by forming the hard layer 229 with a nitrided film, not only problems such as exfoliation can be avoided compared to the plating, but also the hard layer 229 can be formed on the outer surface without increasing an outer diameter of the a movable core 22 which is composed of a cylindrical body.

In addition, by forming the nitrided film with high-frequency heating, the nitrided film can be processed at high speed. Further, in other embodiment, the example where the hard layer 229 is formed on the outer surface of the shaft-less movable core 22 is shown, but the hard layer 229 may be formed on a movable core having a shaft (not shown).

Also, because the hard layer 229 is formed on the whole outer surface of the movable core 22, when the movable core 22 is displaced in one or another direction along the axial direction so as to abut on the first stopper 227 or the second stopper 125, the wear resistance and the durability at the end face on which the movable core 22 abuts can be enhanced.

Further, because the hard layer 229 is formed on the whole outer surface of the movable core 22, when one end of the shaft 40b abuts on the end face of the movable core 22, the wear resistance and the durability at the end face on which the movable core 22 abuts can be enhanced.

The oil pressure control unit 210 according to still other embodiment of the present invention is basically constituted as described above. Next, an explanation will be given on operational effects of the oil pressure control unit 210.

Further, in other embodiment, by providing a hard layer 229 which is harder than the inside of the movable core 22 at a contact region to the bearing (the first plain bearing 36a and the second plain bearing 36b) on an outer surface of the movable core 22, a hardness of the outer surface of the movable core 22 is increased, resulting in enhancement of the wear resistance between the bearing (the first plain bearing 36a and the second plain bearing 36b) and the contact region.

Concretely, the wear resistance at the contact region between the outer circumference surface of the movable core 22 and the inner circumference surface of the bearing (the first plain bearing 36a and the second plain bearing 36b) can be enhanced. In this case, because the wear resistance is enhanced, the preferable slidability between the movable core 22 and the bearing (the first plain bearing 36a and the second plain bearing 36b) can be obtained. As a result, the hysteresis property of the linear solenoid portion 12 can be enhanced.

Also, in still other embodiment, the recess 20a to which the movable core 22 faces is formed on the fixed core 20, the second stopper 125 which is made of the nonmagnetic material and limits the displacement of the movable core 22 in another direction is provided in the through hole 20c which continues to the recess 20a, and the second stopper 125 is provided with the inserting hole 125c through which the spool 40 (the displacement transmission member) to transmit the displacement of the movable core 22 is inserted. As a result, in still other embodiment, if the movable core 22 is not provided with the conventional shaft (i.e., the shaft-less structure), the second stopper 125 can be set easily as a nonmagnetic stopper to prevent contact to the fixed core 20 of the movable core 22.

Further, in still other embodiment, the housing bottom surface 14c is provided with the first stopper 227 which is made of the nonmagnetic material and limits the displacement of the movable core 22 in one direction, and the swaging portion 14e which swages the first stopper 227 so as to hold it. As a result, in still other embodiment, by providing the nonmagnetic first stopper 227 to limit the displacement of the movable core 22 in one direction, the space in which the movable core 22 is provided can be prevented from intrusion of contamination easily. Further, in other embodiment, by providing the swaging portion 14e on the housing bottom surface 14c, the first stopper 227 can be held to the housing bottom surface 14c easily, the assembling operation can be facilitated, and the assembly performance can be enhanced.

Figure 19:
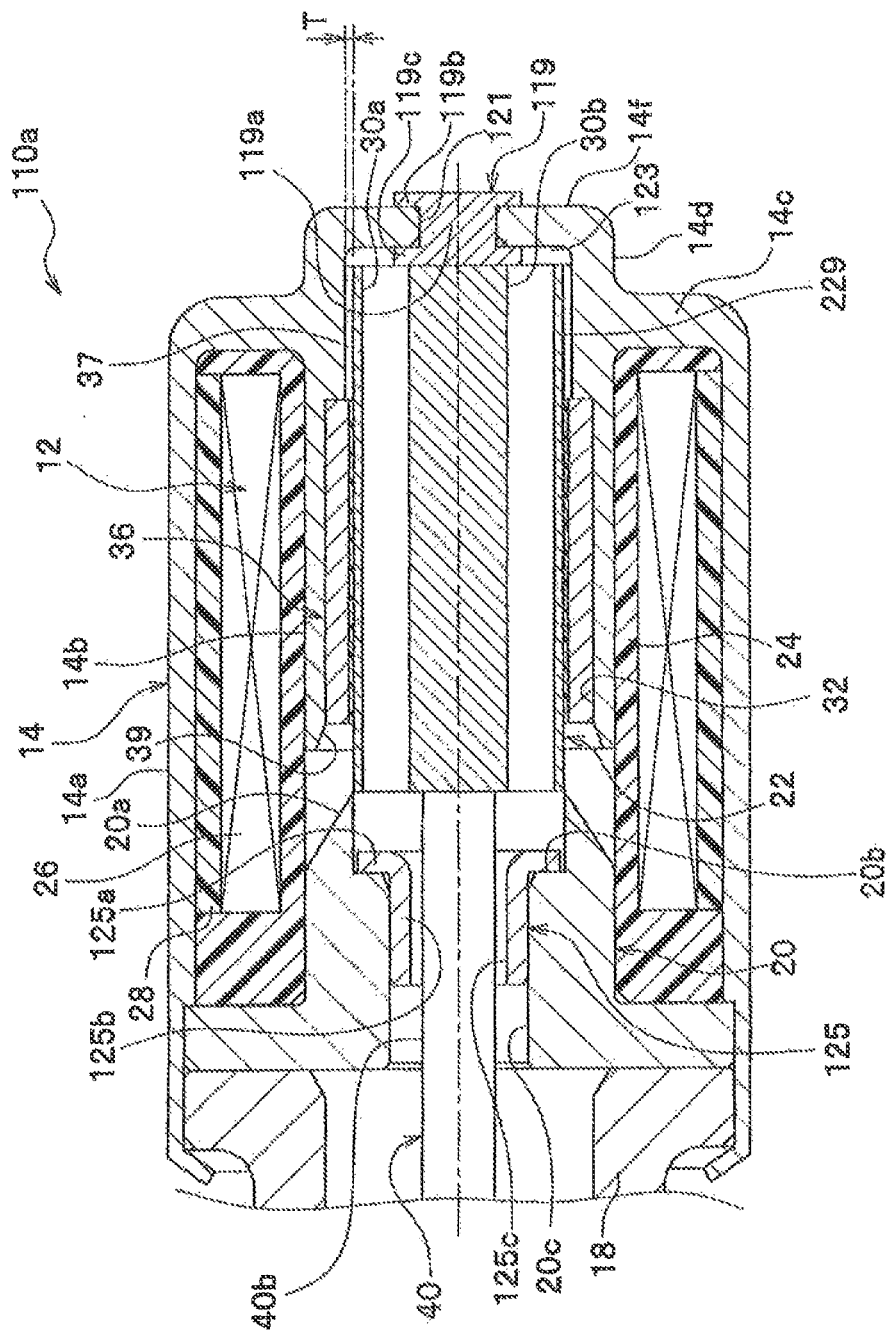
FIG. 19 is an enlarged longitudinal cross-sectional view of a modified example in which a movable core having a hard layer is incorporated in the oil pressure control unit shown in FIG. 8.

Next, to the oil pressure control unit 110 shown in FIG. 8, a modified example in which the movable core 22 having the hard layer 229 formed on the whole outer surface is incorporated is shown in FIG. 19. In addition, because the oil pressure control unit 110a according to this modified example has operational effects like those of the still other embodiment, detailed explanation will be omitted.

What is claimed is:

1. A linear solenoid comprising:
    linear solenoid portion which is provided in a housing, comprising:
        a coil;
        a cylindrical movable core which is attracted toward a fixed core when the coil is energized; and
        a cylindrical yoke which surrounds an outer circumference surface of the movable core,
        wherein said cylindrical yoke and said fixed core are spaced apart from each other,
        wherein said cylindrical yoke and said housing constitute a single member, and
        wherein the movable core has a shaft-less structure, one or more bearings for slidably supporting the movable core are attached to one or more annular recesses formed in the cylindrical yoke, and the one or more bearings contact less than the entire surface of the movable core and project by a predetermined length from an inner circumference surface of the cylindrical yoke toward the movable core, such that the movable core slidingly contacts only said one or more bearings.

2. The linear solenoid according to claim 1, wherein the bearing comprises a plurality of bearings, and a plurality of annular recesses into which the bearing can be inserted along the axis of the cylindrical yoke are provided at both ends of the inner circumference surface of the cylindrical yoke.

3. The linear solenoid according to claim 1, wherein the housing comprises: a housing bottom surface which is provided at one end of the housing along an axis of the housing; a cylindrical projection which extends from the housing bottom surface; and a swaging portion which extends from the cylindrical projection, a disc member made of a nonmagnetic material which is provided at one end of the housing, and abuts on the cylindrical projection so as to be held by the swaging portion so that the disc member blocks an opening at one end of the housing.

4. The linear solenoid according to claim 3, wherein one end of the movable core which faces to the housing bottom surface is arranged so as to intersect a line which is approximately orthogonal to an axis of the movable core and passes through a thick central portion along an axis of the housing bottom surface.

5. The linear solenoid according to claim 4, wherein the bearing to support one end of the movable core is arranged so as to intersect a line which is approximately orthogonal to an axis of the movable core and passes through a thick central portion along an axis of the housing bottom surface.

6. The linear solenoid according to claim 1, wherein the bearing comprises a single bearing, and a single annular recess into which the bearing can be inserted from the fixed core along the axis of the cylindrical yoke is provided on the fixed core side of the inner circumference surface of the cylindrical yoke.

7. The linear solenoid according to claim 1, wherein the housing comprises a housing bottom surface which is provided at one end along an axis of the housing; a cylindrical projection which extends from the housing bottom surface; and a projecting bottom portion which extends from the cylindrical projection, a first stopper which is made of a nonmagnetic material and limits a displacement of the movable core in one direction is provided through the projecting bottom portion, and the first stopper is fixed to the projecting bottom portion by swaging a cylindrical portion passing through a through hole of the projecting bottom portion so as to plastically deform an inner wall of the projecting bottom portion.

8. The linear solenoid according to claim 7, wherein a recess to which the movable core faces is formed on the fixed core, a second stopper to limit a displacement of the movable core in another direction is pushed into a hole which continues to the recess, and the second stopper is provided with a inserting hole through which a displacement transmission member to transmit the displacement of the movable core is inserted.

9. A linear solenoid comprising:
linear solenoid portion which is provided in a housing, comprising:
  a coil;
  a movable core which is attracted toward a fixed core when the coil is energized; and
  a cylindrical yoke which surrounds an outer circumference surface of the movable core,
  wherein said cylindrical yoke and said fixed core are spaced apart from each other,
  wherein said cylindrical yoke and said housing constitute a single member, and
  wherein one or more bearings for slidably supporting the movable core are attached to one or more annular recesses formed in the cylindrical yoke, and the one or more bearings contact less than the entire surface of the movable core and project by a predetermined length from an inner circumference surface of the cylindrical yoke toward the movable core, such that the movable core slidingly contacts only said one or more bearings, and
  a hard layer which is harder than the inside of the movable core is provided at a contact region to the bearing on an outer surface of the movable core.

10. The linear solenoid according to claim 9, wherein the hard layer is formed with a NIP plating.

11. The linear solenoid according to claim 9, wherein the hard layer is formed with a nitrided film.

12. The linear solenoid according to claim 11, wherein the nitrided film is formed by high-frequency heating.

13. A valve operating mechanism comprising:
a valve body having a plurality of ports through which a pressure fluid flows;
the linear solenoid according to claim 1; and
a valve element which is provided within the valve body and switches between a communication state and a dis-communication state among the plurality of ports by displacement of the movable core.

* * * * *